United States Patent
Byers

(10) Patent No.: US 8,670,019 B2
(45) Date of Patent: Mar. 11, 2014

(54) SYSTEM AND METHOD FOR PROVIDING ENHANCED EYE GAZE IN A VIDEO CONFERENCING ENVIRONMENT

(75) Inventor: Charles C. Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 146 days.

(21) Appl. No.: 13/096,772

(22) Filed: Apr. 28, 2011

(65) Prior Publication Data

US 2012/0274734 A1 Nov. 1, 2012

(51) Int. Cl.
*H04N 7/14* (2006.01)

(52) U.S. Cl.
USPC ............... 348/14.16; 348/14.01

(58) Field of Classification Search
USPC ............... 348/14.01–14.09, 14.16
See application file for complete search history.

(56) References Cited

U.S. PATENT DOCUMENTS

| | | | |
|---|---|---|---|
| 2,911,462 A | 11/1959 | Brady | |
| D212,798 S | 11/1968 | Dreyfuss | |
| 3,793,489 A | 2/1974 | Sank | |
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 4,994,912 A | 2/1991 | Lumelsky et al. | |
| 5,003,532 A | 3/1991 | Ashida et al. | |
| 5,020,098 A | 5/1991 | Celli | |
| 5,136,652 A | 8/1992 | Jibbe et al. | |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

Smarthome, "IR Extender Expands Your IR Capabilities," [retrieved and printed on Apr. 22, 2009], http://www.smarthome.com/8121.html; 3 pages.

(Continued)

*Primary Examiner* — Curtis Kuntz
*Assistant Examiner* — Sunita Joshi
(74) *Attorney, Agent, or Firm* — Patent Capital Group

(57) ABSTRACT

An apparatus is provided in one example and includes first and second cameras configured to capture image data associated with an end user involved in a video session. The can further include a display configured to interface with the cameras, and a shaft coupled to a rotor. The cameras are secured to the shaft, and the shaft receives a rotational force such that during rotation of the shaft, the cameras pass over the display in order to capture particular image data associated with the end user's face in such a way as to improve eye gaze alignment.

20 Claims, 11 Drawing Sheets

(56) References Cited

U.S. PATENT DOCUMENTS

| | | | |
|---|---|---|---|
| D341,848 S | 11/1993 | Bigelow et al. | |
| 5,268,734 A | 12/1993 | Parker et al. | |
| 5,317,405 A | 5/1994 | Kuriki et al. | |
| 5,337,363 A | 8/1994 | Platt | |
| 5,347,363 A | 9/1994 | Yamanaka | |
| 5,351,067 A | 9/1994 | Lumelsky et al. | |
| 5,359,362 A * | 10/1994 | Lewis et al. | 348/14.1 |
| D357,468 S | 4/1995 | Rodd | |
| 5,406,326 A | 4/1995 | Mowry | |
| 5,423,554 A | 6/1995 | Davis | |
| 5,446,834 A | 8/1995 | Deering | |
| 5,448,287 A | 9/1995 | Hull | |
| 5,467,401 A | 11/1995 | Nagamitsu et al. | |
| 5,495,576 A | 2/1996 | Ritchey | |
| 5,502,481 A | 3/1996 | Dentinger et al. | |
| 5,502,726 A | 3/1996 | Fischer | |
| 5,506,604 A | 4/1996 | Nally et al. | |
| 5,532,737 A | 7/1996 | Braun | |
| 5,541,639 A | 7/1996 | Takatsuki et al. | |
| 5,541,773 A | 7/1996 | Kamo et al. | |
| 5,570,372 A | 10/1996 | Shaffer | |
| 5,572,248 A | 11/1996 | Allen et al. | |
| 5,587,726 A | 12/1996 | Moffat | |
| 5,612,733 A * | 3/1997 | Flohr | 348/14.16 |
| 5,625,410 A | 4/1997 | Washino et al. | |
| 5,666,153 A | 9/1997 | Copeland | |
| 5,673,401 A | 9/1997 | Volk et al. | |
| 5,675,374 A | 10/1997 | Kohda | |
| 5,715,377 A | 2/1998 | Fukushima et al. | |
| D391,935 S | 3/1998 | Sakaguchi et al. | |
| D392,269 S | 3/1998 | Mason et al. | |
| 5,729,471 A | 3/1998 | Jain et al. | |
| 5,737,011 A | 4/1998 | Lukacs | |
| 5,748,121 A | 5/1998 | Romriell | |
| 5,760,826 A | 6/1998 | Nayar | |
| 5,790,182 A | 8/1998 | St. Hilaire | |
| 5,796,724 A | 8/1998 | Rajamani et al. | |
| 5,815,196 A | 9/1998 | Alshawi | |
| 5,818,514 A | 10/1998 | Duttweiler et al. | |
| 5,821,985 A | 10/1998 | Iizawa | |
| 5,889,499 A | 3/1999 | Nally et al. | |
| 5,894,321 A | 4/1999 | Downs et al. | |
| D410,447 S | 6/1999 | Chang | |
| 5,940,118 A | 8/1999 | Van Schyndel | |
| 5,940,530 A | 8/1999 | Fukushima et al. | |
| 5,953,052 A | 9/1999 | McNelley et al. | |
| 5,956,100 A | 9/1999 | Gorski | |
| 6,069,658 A | 5/2000 | Watanabe | |
| 6,088,045 A | 7/2000 | Lumelsky et al. | |
| 6,097,441 A | 8/2000 | Allport | |
| 6,101,113 A | 8/2000 | Paice | |
| 6,124,896 A | 9/2000 | Kurashige | |
| 6,148,092 A | 11/2000 | Qian | |
| 6,167,162 A | 12/2000 | Jacquin et al. | |
| 6,172,703 B1 | 1/2001 | Lee | |
| 6,173,069 B1 | 1/2001 | Daly et al. | |
| 6,226,035 B1 | 5/2001 | Korein et al. | |
| 6,243,130 B1 | 6/2001 | McNelley et al. | |
| 6,249,318 B1 | 6/2001 | Girod et al. | |
| 6,256,400 B1 | 7/2001 | Takata et al. | |
| 6,266,082 B1 | 7/2001 | Yonezawa et al. | |
| 6,266,098 B1 | 7/2001 | Cove et al. | |
| 6,285,392 B1 | 9/2001 | Satoda et al. | |
| 6,292,575 B1 | 9/2001 | Bortolussi et al. | |
| 6,356,589 B1 | 3/2002 | Gebler et al. | |
| 6,380,539 B1 | 4/2002 | Edgar | |
| 6,424,377 B1 | 7/2002 | Driscoll, Jr. | |
| 6,430,222 B1 | 8/2002 | Okadia | |
| 6,459,451 B2 | 10/2002 | Driscoll et al. | |
| 6,462,767 B1 | 10/2002 | Obata et al. | |
| 6,493,032 B1 | 12/2002 | Wallerstein et al. | |
| 6,507,356 B1 | 1/2003 | Jackel et al. | |
| 6,573,904 B1 | 6/2003 | Chun et al. | |
| 6,577,333 B2 | 6/2003 | Tai et al. | |
| 6,583,808 B2 | 6/2003 | Boulanger et al. | |
| 6,590,603 B2 | 7/2003 | Sheldon et al. | |
| 6,591,314 B1 | 7/2003 | Colbath | |
| 6,593,955 B1 | 7/2003 | Falcon | |
| 6,593,956 B1 | 7/2003 | Potts et al. | |
| 6,611,281 B2 | 8/2003 | Strubbe | |
| 6,680,856 B2 | 1/2004 | Schreiber | |
| 6,693,663 B1 | 2/2004 | Harris | |
| 6,694,094 B2 | 2/2004 | Partynski et al. | |
| 6,704,048 B1 | 3/2004 | Malkin et al. | |
| 6,710,797 B1 | 3/2004 | McNelley et al. | |
| 6,751,106 B2 | 6/2004 | Zhang et al. | |
| D492,692 S | 7/2004 | Fallon et al. | |
| 6,763,226 B1 | 7/2004 | McZeal | |
| 6,768,722 B1 | 7/2004 | Katseff et al. | |
| 6,774,927 B1 | 8/2004 | Cohen et al. | |
| 6,795,108 B2 | 9/2004 | Jarboe et al. | |
| 6,795,558 B2 | 9/2004 | Matsuo et al. | |
| 6,798,834 B1 | 9/2004 | Murakami et al. | |
| 6,806,898 B1 | 10/2004 | Toyama et al. | |
| 6,807,280 B1 | 10/2004 | Stroud et al. | |
| 6,831,653 B2 | 12/2004 | Kehlet et al. | |
| 6,844,990 B2 | 1/2005 | Artonne et al. | |
| 6,853,398 B2 | 2/2005 | Malzbender et al. | |
| 6,867,798 B1 | 3/2005 | Wada et al. | |
| 6,882,358 B1 | 4/2005 | Schuster et al. | |
| 6,888,358 B2 | 5/2005 | Lechner et al. | |
| 6,909,438 B1 | 6/2005 | White et al. | |
| 6,911,995 B2 | 6/2005 | Ivanov et al. | |
| 6,917,271 B2 | 7/2005 | Zhang et al. | |
| 6,922,718 B2 | 7/2005 | Chang | |
| 6,963,653 B1 | 11/2005 | Miles | |
| 6,980,526 B2 | 12/2005 | Jang et al. | |
| 6,989,754 B2 | 1/2006 | Kiscanin et al. | |
| 6,989,836 B2 | 1/2006 | Ramsey | |
| 6,989,856 B2 | 1/2006 | Firestone et al. | |
| 6,990,086 B1 | 1/2006 | Holur et al. | |
| 7,002,973 B2 | 2/2006 | MeLampy et al. | |
| 7,023,855 B2 | 4/2006 | Haumont et al. | |
| 7,028,092 B2 | 4/2006 | MeLampy et al. | |
| 7,031,311 B2 | 4/2006 | MeLampy et al. | |
| 7,043,528 B2 | 5/2006 | Schmitt et al. | |
| 7,046,862 B2 | 5/2006 | Ishizaka et al. | |
| 7,057,636 B1 | 6/2006 | Cohen-Solal et al. | |
| 7,057,662 B2 | 6/2006 | Malzbender | |
| 7,061,896 B2 | 6/2006 | Jabbari et al. | |
| 7,072,504 B2 | 7/2006 | Miyano et al. | |
| 7,072,833 B2 | 7/2006 | Rajan | |
| 7,080,157 B2 | 7/2006 | McCanne | |
| 7,092,002 B2 | 8/2006 | Ferren et al. | |
| 7,111,045 B2 | 9/2006 | Kato et al. | |
| 7,126,627 B1 * | 10/2006 | Lewis et al. | 348/14.16 |
| 7,131,135 B1 | 10/2006 | Virag et al. | |
| 7,136,651 B2 | 11/2006 | Kalavade | |
| 7,139,767 B1 | 11/2006 | Taylor et al. | |
| D533,525 S | 12/2006 | Arie | |
| D533,852 S | 12/2006 | Ma | |
| D534,511 S | 1/2007 | Maeda et al. | |
| D535,954 S | 1/2007 | Hwang et al. | |
| 7,158,674 B2 | 1/2007 | Suh | |
| 7,161,942 B2 | 1/2007 | Chen et al. | |
| D539,243 S | 3/2007 | Chiu et al. | |
| 7,197,008 B1 | 3/2007 | Shabtay et al. | |
| D541,773 S | 5/2007 | Chong et al. | |
| D542,247 S | 5/2007 | Kinoshita et al. | |
| 7,221,260 B2 | 5/2007 | Berezowski et al. | |
| D545,314 S | 6/2007 | Kim | |
| 7,239,338 B2 | 7/2007 | Krisbergh et al. | |
| 7,246,118 B2 | 7/2007 | Chastain et al. | |
| D550,635 S | 9/2007 | DeMaio et al. | |
| D551,184 S | 9/2007 | Kanou et al. | |
| 7,269,292 B2 | 9/2007 | Steinberg | |
| 7,274,555 B2 | 9/2007 | Kim et al. | |
| D555,610 S | 11/2007 | Yang et al. | |
| D559,265 S | 1/2008 | Armstrong et al. | |
| D560,681 S | 1/2008 | Fletcher | |
| D561,130 S | 2/2008 | Won et al. | |
| 7,336,299 B2 | 2/2008 | Kostrzewski | |
| D567,202 S | 4/2008 | Rieu Piquet | |
| 7,352,809 B2 | 4/2008 | Wenger et al. | |

(56) References Cited

U.S. PATENT DOCUMENTS

| | | |
|---|---|---|
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| D636,359 S | 4/2011 | Buzzard et al. |
| D636,747 S | 4/2011 | Buzzard et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1* | 4/2003 | Tanigaki ..................... 349/61 |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |

(56) References Cited

U.S. PATENT DOCUMENTS

| | | |
|---|---|---|
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2011/0008017 A1 | 1/2011 | Gausereide |
| 2011/0037636 A1 | 2/2011 | Alexander |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1768058 A2 | 3/2007 |
| EP | 2073543 A1 | 6/2009 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO2007/106157 | 9/2007 |
| WO | WO2007/123946 | 11/2007 |
| WO | WO 2007/123960 | 11/2007 |
| WO | WO2008/039371 | 4/2008 |
| WO | WO 2008/040258 | 4/2008 |
| WO | WO 2008/101117 | 8/2008 |
| WO | WO 2008/118887 | 10/2008 |
| WO | WO 2009/102503 | 8/2009 |
| WO | WO 2009/120814 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The

(56) References Cited

OTHER PUBLICATIONS

International Society for Optical Engineering SPIE—Int. Soc. Opt. Eng USA ISSN: 0277-786X; XP007905596; pp. 78-88.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Super Home Inspectors or Super Inspectors, [retrieved and printed on Mar. 18, 2010] http://www.umrt.com/PageManager/Default.aspx/PageID=2120325; 3 pages.

Tan, Kar-Han, et al., "Appearance-Based Eye Gaze Estimation," In Proceedings IEEE WACV'02, 2002, 5 pages; http://citeseer.ist.psu.edu/viewdoc/summary?doi=10.1.1.19.8921.

Total immersion, Video Gallery, copyright 2008-2009 [retrieved and printed on Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Veratech Corp., "Phantom Sentinel," © Veratech Aero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Wi-Fi Protected Setup, from Wikipedia, Sep. 2, 2010, 3 pages http://en.wikipedia.org/wiki/Wi-Fi_Protected_Setup.

Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.

WirelessDevNet, Melody Launches Bluetooth Over IP, [retrieved and printed on Jun. 5, 2010] http://www.wirelessdevnet.com/news/2001/155/news5.html; 2 pages.

Xia, F., et al., "Home Agent Initiated Flow Binding for Mobile IPv6," Network Working Group, Oct. 19, 2009, 15 pages; http://toolsietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pgs.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

PRC Aug. 3, 2012 SIPO First Office Action from Chinese Application No. 200980119121.5; 16 pages.

PRC Dec. 18, 2012 Response to SIPO First Office Action from Chinese Application No. 200980119121.5; 16 pages.

PRC Jan. 7, 2013 SIPO Second Office Action from Chinese Application Serial No. 200980105262.1.

PRC Apr. 3, 2013 SIPO Second Office Action from Chinese Application No. 200980119121.5; 16 pages.

"Oblong Industries is the developer of the g-speak spatial operation environment," Oblong Industries Information Page, 2 pages, [Retrieved and printed on Dec. 1, 2010] http://oblong.com.

(56) References Cited

OTHER PUBLICATIONS

Underkoffler, John, "G-Speak Overview 1828121108," video clip, Vimeo.com, 1 page, [Retrieved and printed on Dec. 1, 2010] http://vimeo.com/2229299.
Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.
"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.
Kramer, Kwindla, "Oblong at TED," Oblong Industries, Inc. Web Log, Jun. 6, 2010, 1 page; http://oblong.com/article/OB22LFIS1NVyrOmR.html.
"John Underkoffler points to the future of UI," video clip and interactive transcript, Video on TED.com, Jun. 2010, 6 pages; http://www.ted.com/talks/john_underkoffler_drive_3d_data_with_a_gesture.html.
Kramer, Kwindla, "Oblong on Bloomberg TV," Oblong Industries, Inc. Web Log, Jan. 28, 2010, 1 page; http://oblong.com/article/0AN_1KD9q990PEnw.html.
Kramer, Kwindla, "g-speak at RISD, Fall 2009," Oblong Industries, Inc. Web Log, Oct. 29, 2009, 1 page; http://oblong.com/article/09uW060q6xRIZYvm.html.
Kramer, Kwindla, "g-speak + TMG," Oblong Industries, Inc. Web Log, Mar. 24, 2009, 1 page; http://oblong.com/article/08mM77zpYMm7kFtv.html.
"g-stalt version 1," video clip, YouTube.com, posted by zigg1es on Mar. 15, 2009, 1 page; http://youtube.com/watch?v=k8ZAql4mdvk.
Underkoffler, John, "Carlton Sparrell speaks at MIT," Oblong Industries, Inc. Web Log, Oct. 30, 2009, 1 page; http://oblong.com/article/09usAB4l1Ukb6CPw.html.
Underkoffler, John, "Carlton Sparrell at MIT Media Lab," video clip, Vimeo.com, 1 page, [Retrieved and printed Dec. 1, 2010] http://vimeo.com/7355992.
Underkoffler, John, "Oblong at Altitude: Sundance 2009," Oblong Industries, Inc. Web Log, Jan. 20, 2009, 1 page; http://oblong.com/article/08Sr62ron_2akg0D.html.
Underkoffler, John, "Oblong's tamper system 1801011309," video clip, Vimeo.com, 1 page, [Retrieved and printed Dec. 1, 2010] http://vimeo.com/2821182.
Feld, Brad, "Science Fact," Oblong Industries, Inc. Web Log, Nov. 13, 2008, 2 pages,http://oblong.com/article/084H-PKI5Tb914Ti.html.
Kwindla Kramer, "g-speak in slices," Oblong Industries, Inc. Web Log, Nov. 13, 2008, 6 pages; http://oblong.com/article/0866JqfNrFg1NeuK.html.
Underkoffler, John, "Origins: arriving here," Oblong Industries, Inc. Web Log, Nov. 13, 2008, 5 pages; http://oblong.com/article/085zBpRSY9JeLv2z.html.
Rishel, Christian, "Commercial overview: Platform and Products," Oblong Industries, Inc., Nov. 13, 2008, 3 pages; http://oblong.com/article/086E19gPvDcktAf9.html.
EPO Feb. 25, 2011 Communication for EP09725288.6 (published as EP22777308); 4 pages.
EPO Aug. 15, 2011 Response to EPO Communication mailed Feb. 25, 2011 from European Patent Application No. 09725288.6; 15 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
EPO Jul. 10, 2012 Response to EP Communication from European Application EP10723445.2.
EPO Sep. 24, 2012 Response to Mar. 20, 2012 EP Communication from European Application EP09725288.6.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.
Active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.
Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding," Multimedia Systems; 9 Springer-Verlag 1994, Multimedia Systems (1994) 2 pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree

(56) References Cited

OTHER PUBLICATIONS

Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0/8186-8821-8; XP010586786; pp. 443-447.

Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (Yes!); Jan. 26, 2009; http://i.gizmodo.com/5138797/iphone-bluetooth-file-transfer-coming-soon-yes; 1page.

Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.

DVE Digital Video Enterprises, "DVE Tele-Immersion Room," [retrieved and printed on Feb. 5, 2009] http://www.dvetelepresence.com/products/immersion_room.asp; 2 pages.

Dynamic Displays, copyright 2005-2008 [retrieved and printed on Feb. 24, 2009] http://www.zebraimaging.com/html/lighting_display.html, 2 pages.

ECmag.com, "IBS Products," Published Apr. 2009; http://www.ecmag.com/index.cfm?fa=article&articleID=10065; 2 pages.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03pdf.

eJamming Audio, Learn More; [retrieved and printed on May 27, 2010] http://www.ejamming.com/learnmore/; 4 pages.

Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

Freeman, Professor Wilson T., Computer Vision Lecture Slides, "6.869 Advances in Computer Vision: Learning and Interfaces," Spring 2005; 21 pages.

Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: a Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in AS3 and Flash CS3, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Guili, D., et al., "Orchestra!: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.ore/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—D0I:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

PCT May 11, 2010 International Search Report from PCT/US2010/024059; 4 pages.

PCT Mar. 21, 2013 International Preliminary Report on Patentability from International Application Serial No. PCT/US2011/050380.

PCT May 30, 2013 International Preliminary Report on Patentability and Written Opinion from the International Searching Authority for International Application Serial No. PCT/US2011/061442 8 pages.

PCT May 30, 2013 International Preliminary Report on Patentability and Written Opinion from the International Searching Authority for International Application Serial No. PCT/US2011/060579 6 pages.

PCT May 30, 2013 International Preliminary Report on Patentability and Written Opinion from the International Searching Authority for International Application Serial No. PCT/US2011/060584 7 pages.

PRC Jun. 18, 2013 Response to SIPO Second Office Action from Chinese Application No. 200980119121.5; 5 pages.

Chien et al., "Efficient moving Object Segmentation Algorithm Using Background Registration Technique," IEEE Transactions on Circuits and Systems for Video Technology, vol. 12, No. 7, Jul. 2002, 10 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

(56) References Cited

OTHER PUBLICATIONS

Holographic Imaging, "Dynamic Holography for scientific uses, military heads up display and even someday HoloTV Using TI's DMD," [retrieved and printed on Feb. 26, 2009] http://innovation.swmed.edu/research/instrumentation/res_inst_dev3d.html; 5 pages.

Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

IR Distribution Category @ Envious Technology, "IR Distribution Category," [retrieved and printed on Apr. 22, 2009] http://www.envioustechnology.com.au/ products/product-list.php?CID=305; 2 pages.

IR Trans—Products and Orders—Ethernet Devices, [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages http://fulfillment.umi.com/dissertations/b7afbcb56ba721db14d26dfccc6b470f/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Lawson, S., "Cisco Plans TelePresence Translation Next Year," Dec. 9, 2008; http://www.pcworld.com/ article/155237/.html?tk=rss_news; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/Ijy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrI.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Minoru from Novo is the worlds first consumer 3D Webcam, Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/

(56) References Cited

OTHER PUBLICATIONS vsd-articles-tools-template.articles.vision-systems-design.volume-11.issue-10.departments.new-products.vision-automation-products. htmlhtml; 11 pages.
OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.
OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.
OptoIQ, "Vision Systems Design—Machine Vision and Image Processing Technology," [retrieved and printed on Mar. 18, 2010], http://www.optoiq.com/index/machine-vision-imaging-processing.html; 2 pages.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Payatagool, Chris, "Orchestral Manoeuvres in the Light of Telepresence," Telepresence Options, Nov. 12, 2008; http://www.telepresenceoptions.com/2008/11/orchestral_manoeuvres; 2 pages.
PCT May 15, 2006 International Report of Patentability dated May 15, 2006, for PCT International Application PCT/US2004/021585, 6 pages.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 24, 2010 PCT International Search Report mailed Aug. 24, 2010 for PCT/US2010033880; 4 pages.
PCT Aug. 26, 2010 International Preliminary Report on Patentability mailed Aug. 26, 2010 for PCT/US2009/001070; 10 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Radhika, N., et al., "Mobile Dynamic reconfigurable Context aware middleware for Adhoc smart spaces," vol. 22, 2008, http://www.acadjournal.com/2008/V22/part6/p7; 3 pages.
Rayvel Business-to-Business Products, copyright 2004 [retrieved and printed on Feb. 24, 2009], http://www.rayvel.com/b2b.html; 2 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Rikert, T.D., et al., "Gaze Estimation using Morphable models," IEEE International Conference on Automatic Face and Gesture Recognition, Apr. 1998; 7 pgs. http://citeseer.ist.psu.edu/viewdoc/summary?doi=10.1.1.30.9472.
Robust Face Localisation Using Motion, Colour & Fusion; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcu.ie/wwwadmin/fyp-abstract/list/fyp_details05.jsp?year=2005&number=51470574; 1 page.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.
SENA, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
U.S. Appl. No. 12/366,593, filed Feb. 5, 2009, entitled "System and Method for Depth Perspective Image Rendering," Inventor(s): J. William Mauchly et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.

(56) References Cited

OTHER PUBLICATIONS

U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011 ,entitled "System and Method for Selection of Video Data in a Video Conference Environment," Inventor(s) Sylvia Olayinka Aya Manfa N'guessan.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 12/784,257, filed May 20, 2010, entitled "Implementing Selective Image Enhancement," Inventors: Dihong Tian et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/375,619, filed Sep. 24, 2010, entitled "Freestanding Video Unit," Inventor(s): Ashok T. Desai et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
PCT "International Search Report and the Written Opinion of the International Searching Authority, or the Declaration," PCT/US2010/026456, dated Jun. 29, 2010; 11 pages.
PCT "Notification of Transmittal of the International Search Report and the Written Opinion of the International Searching Authority, or the Declaration," PCT/US2009/001070, dated Apr. 4, 2009; 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability and Written Opinion of the International Searching Authority," PCT/US2009/038310; dated Sep. 28, 2010; 10 pages.
PCT "International Preliminary Report on Patentability dated Sep. 29, 2009, International Search Report, and Written Opinion," for PCT International Application PCT/US2008/058079; dated Sep. 18, 2008, 10 pages.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
Digital Video Enterprises, "DVE Eye Contact Silhouette," 1 page, © DVE 2008; http://www.dvetelepresence.com/products/eyeContactSilhouette.asp.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Joshua Gluckman and S.K. Nayar, "Rectified Catadioptric Stereo Sensors," 8 pages, retrieved and printed on May 17, 2010; http://cis.poly.edu/~gluckman/papers/cvpr00.pdf.
R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Trevor Darrell, "A Real-Time Virtual Mirror Display," 1 page, Sep. 9, 1998; http://people.csail.mit.edu/trevor/papers/1998-021/node6.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
U.S. Appl. No. 13/106,002, filed May 12, 2011, entitled "System and Method for Video Coding in a Dynamic Environment," Inventors: Dihong Tian et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Appl. No. 13/298,022, filed Nov. 16, 2011, entitled "System and Method for Alerting a Participant in a Video Conference," Inventor(s): TiongHu Lian, et al.
"Cisco Expo Germany 2009 Opening," Posted on YouTube on May 4, 2009; http://www.youtube.com/watch?v=SDKsaS1z4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," [retrieved and printed on May 24, 2010] http://www.electrophysics.com/Browse/Brw_ProductLineCategory.asp?CategoryID=184&Area=IS; 2 pages.

(56) References Cited

OTHER PUBLICATIONS

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

* cited by examiner

SYSTEM AND METHOD FOR PROVIDING ENHANCED EYE GAZE IN A VIDEO CONFERENCING ENVIRONMENT

TECHNICAL FIELD

This disclosure relates in general to the field of video conferencing and, more particularly, to a system and a method for providing enhanced eye gaze in a video conferencing environment.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. Some issues have arisen in video conferencing scenarios where proper eye gaze is not achieved during a video conference. The ability to optimize eye gaze provides a significant challenge to system designers, device manufacturers, and participants of video conferences.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An apparatus is provided in one example and includes first and second cameras configured to capture image data associated with an end user involved in a video session. The can further include a display configured to interface with the cameras, and a shaft coupled to a rotor. The cameras can be secured to the shaft, and the shaft can receive a rotational force such that during rotation of the shaft, the cameras pass over the display in order to capture particular image data from a camera perspective that provides correct eye gaze alignment.

In more particular implementations, a video frame is captured as a particular one of the cameras rotates into a position coincident with an eye of a displayed face on the display. Additionally, the apparatus can also include optics elements configured to affect an image path associated with the cameras. The optics elements can include a mirror. In more specific implementations, the shaft is configured to rotate at a rate such that one of the cameras rotates to a shutter trigger position at a frequency equal to a frame rate of an associated video system to which the cameras are associated. A surface finish of the rotor can include an anti-reflective black surface.

The apparatus can also include illumination elements disposed on a perimeter of the display, where at least some of the illumination elements are synchronized to shutter times associated with at least one of the cameras. In more specific instances, the rotational force is supplied by a motor assembly, where motor assembly includes a shaft position encoder configured to determine an angular position of the shaft during its rotation. The apparatus can also include a slip ring assembly configured to bring power and control signals to the cameras and to transfer video signals from the cameras to a next destination.

Example Embodiments

Figure 1:
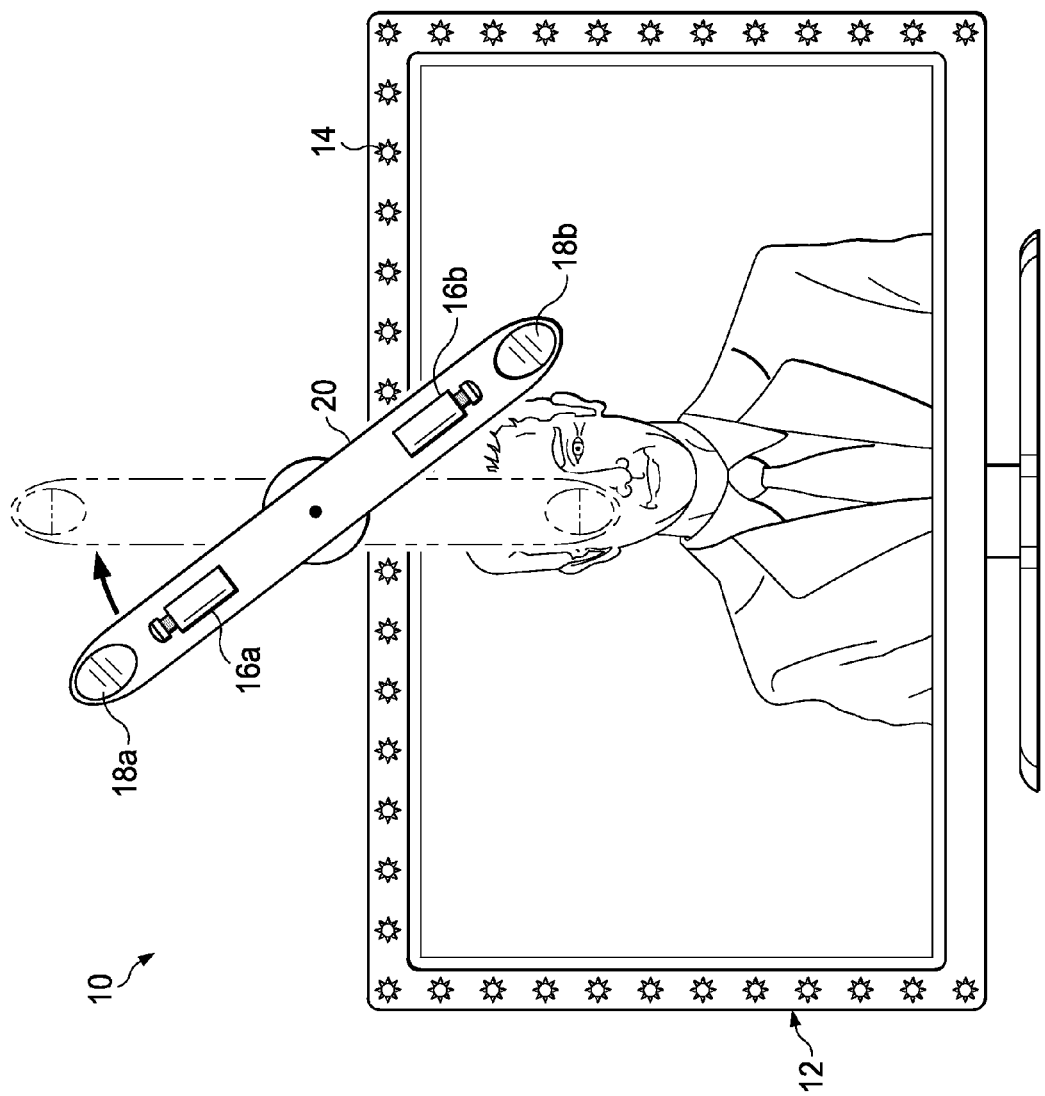
FIG. 1 is a simplified schematic diagram of a system for providing enhanced eye gaze in a video conferencing environment in accordance with one embodiment of the present disclosure.

Turning to FIG. 1, FIG. 1 is a simplified schematic diagram of a system 10 for providing enhanced eye gaze in a video conferencing environment. FIG. 1 includes a display 12, which includes illuminating elements 14 that can be provided along the perimeter of display 12. For example, illuminating elements 14 can be light emitting diodes (LEDs) arranged to illuminate a camera's field of view, for example, mounted on a bezel of display 12. FIG. 1 also includes a set of cameras 16a-b provided on a rotor 20. Note that the architecture illustrated could alternatively use a single camera, as opposed to two cameras, in certain embodiments of the present disclosure. The provisioning of two cameras can reduce the revolutions per minute (RPM) speed, as well as counterbalance each other, which can minimize vibration for the rotating mechanisms of system 10.

Rotor 20 can be driven by a motor (further detailed in FIG. 2), which can derive its energy force from any suitable power source (e.g., battery, outlet, AC or DC sources, solar power, etc.). Rotor 20 is configured to rotate based on the drive force provided by the motor. Rotor 20 may include a set of optics elements 18a-b that are disposed on opposite ends of the shaft. In a particular embodiment, optics elements 18a-b are diagonally designed and/or oval-shaped. In a specific implementation, display 12 may include a number of audio speakers and a stand, which can support or otherwise stabilize display 12.

In accordance with one example implementation, system 10 is configured to provide a camera system for correcting eye gaze in video conferencing environments. System 10 can include a rapidly spinning rotor 20, which carries cameras 16a-b briefly in front of display 12. A video frame can be captured as a particular camera rotates into a position coincident with the eye on the displayed face. This could produce, for example, a proper eye gaze alignment without objectionably obscuring the image. Such an architecture provides improved eye gaze alignment, along with enhancing an individual's video conferencing experience by better simulating individuals being co-located in the same room. Moreover, such an architecture is compact and, further, can be easily integrated into the structure of display 12.

Before detailing the operations and the infrastructure of FIG. 1, certain contextual information is provided to offer an overview of some problems that may be encountered while offering high performance video conferencing in a network environment. Such information is offered earnestly and for teaching purposes only and, therefore, should not be construed in any way to limit the broad applications of the present disclosure.

Eye gaze alignment is an ongoing problem in video conferencing systems. The root cause of this problem is that, in order to render images of people making proper eye contact in a video conference, the cameras capturing the images should be located in front of the screen: exactly where the far end users' eyes would normally appear. Unfortunately, locating the camera at this position for eye gaze reasons causes the camera hardware to obscure the most important parts of the displayed faces, which is unacceptable.

Typical video conferencing architectures offer certain design compromises by locating a camera on the bezel of the screen (e.g., just above the display area). The camera's lens can be approximately 10 centimeters (10 cm) above its optimal position, which results in an imperfect eye alignment. For example, the displayed faces would appear to be looking in the direction of the local participant's chin. This diminishes the illusion of being in the same room with a user's counterparty: an objective for many high-performance video conferencing platforms. Provisioning a camera at a suitable position (e.g., in front of the displayed face's eye), while not impairing the view of the faces, is a significant challenge.

Note that if a video camera were to be bluntly inserted at a coplanar level with an individual's line of sight (e.g., parallel to the user's eyes), the equipment blocks the user's view of display 12. This video camera mounting would be ideal for accurately capturing the individual's face, but at the critical expense of blocking display 12 from the perspective of the local user. Simply mounting the video camera above display 12 eliminates this blocking issue; however, this configuration can be similarly problematic, as it points down toward the user's line of sight and, thereby, creates distortion.

Hence, in most video conferencing systems, the video camera is mounted such that it hangs in front of display 12, where this arrangement can obscure portions of the display area. For example, in the case of 65" video conferencing screens, a small percentage of the display area is obscured. The benefit is that the video camera can be close to the position of the displayed person's eyes, thereby giving a better apparent eye contact than if the video camera were mounted farther above (e.g., on a bezel).

In addition, when this flawed camera positioning scenario is moved to other types of video conferencing systems (e.g., a desktop system, where the display is 24"), and the user sits about two-three feet from display 12, several problems occur. First, the video camera covers an objectionably larger percentage of display 12. Hence, the camera installation (collectively: the custom brackets, the camera, the wires, etc.) obstruct the view of display 12. Furthermore, display 12 is no longer useful as a general-purpose computer display due to the crude positioning of the camera hardware.

Note that certain architectures have attempted to address the aforementioned issues by using a beam splitter. For example, a beam splitter (e.g., a half-silvered mirror) can form a periscope arrangement. The beam-splitter mirror (theoretically) allows the user to see through it, and to see the portion of the screen behind the beam-splitter mirror. However, the display is dimmed by a certain amount. At the same time, the beam splitter typically reflects light coming toward it from the person toward the camera, where this too creates a dimming effect. Beam splitters necessarily dim the light to the camera: resulting in poor image quality. Hence, certain approaches to resolving these eye gaze dilemmas have employed the use of beam splitters, where the camera can be mounted above (or below) a diagonal partially silvered mirror in front of the display. This significantly increases the physical size of the video conferencing system and, further, impairs the display quality.

Additionally, several variants of moving cameras or small mirror assemblies have been attempted with limited success. These strategies typically move the camera (or a small beam splitter) in front of the display screen when the video conferencing mode is triggered. To achieve optimal eye gaze alignment, the camera assembly forcibly obscures the most important parts of the display. Moreover, it is worthwhile to note that these systems take several seconds to move the camera assembly in (or out of) position, which can be inconvenient for participants of the video conference.

In different implementations, multiple camera solutions with various geometric transformation algorithms have also been proposed. These typically fail to provide natural/aesthetic eye contact because the camera is still not located in the correct position. This typically results in a noticeable misalignment (e.g., 15-20°) between the focus of an individual's eyes and the camera. Stated differently, the location at which a given individual focuses his stare, and the location at which a given individual should be staring, are simply inconsistent. This problem is sometimes referred to as 'eye gaze error', which is due to improper camera placement. Note that the optical axis of the camera should be coincident with the position of the eye on the screen. However, the individuals looking at that display would not see the eyes of their counterparty and, instead, would only see the intrusive camera. This severely undermines the intimacy expected of high-quality video conferencing platforms.

In accordance with the teachings of the present disclosure, system 10 is configured to position a camera in a specific location, while not making the camera appear to be hovering over the facial area of individuals, who are participating in the video conference. The architecture of system 10 provides optimal eye gaze alignment without obscuring the displayed image. System 10 can use a rapidly rotating camera assembly that sweeps down in front of the displayed image, and activates the camera's shutter at the precise time when the camera is located in front of the displayed face's eye.

Logistically, since cameras 16*a-b* are moving too fast to be seen and, thereby, only obscure a given portion of the screen (e.g., about 10% of the time), the viewer does not perceive any obscuring of the remote individual being displayed locally. Note that there could be an area of reduced contrast, similar to looking through the blades of a fan, which is acceptable in this environment. Hence, the person watching the display has a perspective similar to that of a person looking through fan blades of a rotating fan device. In one sense, the user is seeing the images and the residual space between turns of rotor 20. By design, the space occupied by the rotating blades can be minimal such that the dominant view is one that is unobstructed by the rotating activities.

In operation of one particular implementation, a pair of high-definition video cameras can be located on opposite ends of rotor 20, which is approximately 30 cm in length in a particular embodiment. In one implementation, diagonal mirrors turn the camera's image paths 90°: directing their view normal to the surface of the display (i.e., towards the local participants to be photographed). The motor is configured to turn rotor 20 with cameras 16a-b (and accompanying optics provided as optics elements 18a-b) at a rate such that one of the cameras rotates to the shutter trigger position at a frequency equal to the frame rate of the video system. For example, in a 30-frame per-second video, the motor can spin a two-camera rotor at 900 RPM. Other embodiments may employ use of multiple cameras, a single camera, or the architecture can be configured to implement different frame rates, which may require different rotation rates.

Semantically, cameras 16a-b can have relatively fast shutter speeds to eliminate motion blur caused by the rapid rotation. New generations of high-definition (HD) cameras have shutter speeds in the range of 10 s of microseconds (under certain conditions). To improve the imaging performance, the image sensors should be sensitive, where the lenses can have a high numerical aperture. In addition, in certain instances, supplemental lighting in the form of an array of LEDs arranged around the monitor bezel may be useful (i.e., shown as illumination elements 14 and FIG. 1). These high power/low duty cycle LEDs can be synchronized to the camera shutter (e.g., much like that of strobe lights).

Figure 2:
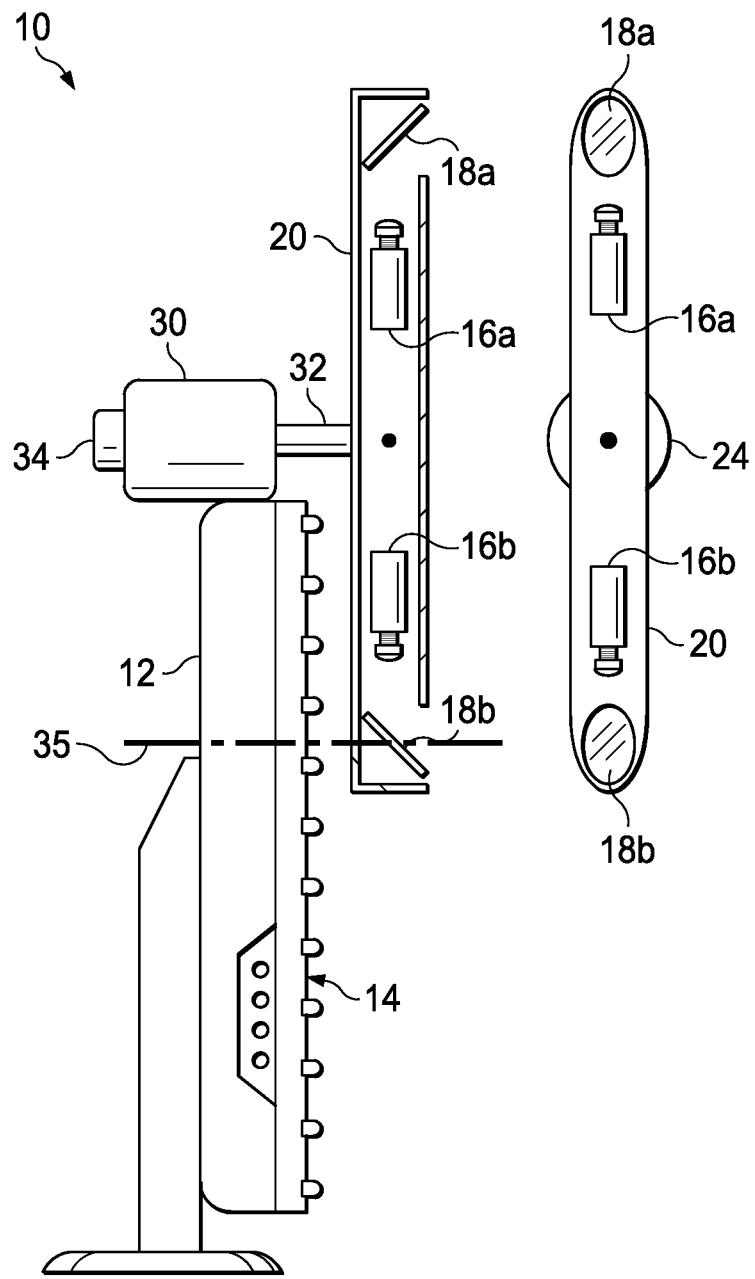
FIG. 2 is a simplified schematic diagram of a side view of the system.

Before turning to additional details and operational capabilities of this architecture, a brief discussion is provided about some of the infrastructure of system 10. Turning to FIG. 2, FIG. 2 is a simplified schematic diagram showing a side view of system 10. A dashed line 35 is provided in FIG. 2 in order to indicate the eye level of an individual's face on display 12. In this particular example of FIG. 2, a motor assembly 30 is mounted in the center of the display's bezel. Motor assembly 30 includes a shaft position encoder 34, which can be configured to determine the precise angular position during rotation. This could, for example, allow system 10 to trigger the shutter at the correct time.

In one particular example, shaft position encoder 34 is a rotary encoder, which is reflective of an electro-mechanical device that converts the angular position or motion of a shaft or axle to an analog or digital code. The output of an incremental encoder can provide information about the motion of the shaft, which can be further processed into information such as speed, distance, RPM, position, etc. Furthermore, if the encoder being used were an absolute encoder, the output of the absolute encoder can indicate the current position of the shaft, making it an angle transducer in certain instances. In one instance, the architecture of the present disclosure implements an absolute encoder, or an incremental encoder with a zero index signal.

FIG. 2 also includes a slip ring assembly 32 configured to bring power and control signals to cameras 16a-b on rotor 20 and, further, to transfer the video signals (from both cameras) off rotor 20. The motor shaft (to the right of slip ring assembly 32) is common to motor assembly 30, encoder 34, slip ring assembly 32, and rotor 20. This could be implemented as a mechanical slip ring, rotary transformer, or rotating fiber optical coupler. Slip ring assembly 32 is configured to provide an electrical connection through a rotating assembly. Slip rings (also referred to as rotary electrical interfaces, rotating electrical connectors, collectors, swivels, or electrical rotary joints) can operate in conjunction with electric motors, electrical generators, etc. In operation, slip ring assembly 32 provides a rotary coupling used to transfer electric current from a stationary unit to a rotating unit. This can be accomplished by either holding the center core stationary, while the brushes and housing rotate around it, or by holding the brushes and housing stationary while the center core is allowed to rotate.

In one particular implementation, rotor 20 is well balanced and stable during rotational activities of system 10. Additionally, the surface finish of rotor 20 and/or the coating on its optics can also be appropriately designed. For example, the rotor's casing can include an anti-reflective relatively flat black surface to minimize ambient light reflections, which may make it more visible (i.e., as a semicircular nearly transparent blur over a portion of the display, as it rapidly spins past the display). Anti-reflective coatings on the optics can achieve a similar function. Rotor 20 may be any suitable mechanical device capable of transferring a rotational force. Additionally, motor assembly 30 can include any suitable brushless DC motors, electronically commutated motors (ECMs), etc., which may be reflective of synchronous electric motors powered by any suitable source.

Note that the architecture of FIG. 2 may also include a proximity sensor to detect obstructions in the way of the rotor movement. This could be included for safety reasons (e.g., when an unknowing participant would point toward the screen and interfere with the pathway of the rotating parts). This could also prevent damage to the rotor equipment. There can be some momentary reversing of motor assembly 30, or some sort of braking mechanism being applied to motor assembly 30 in such scenarios. Hence, appropriate sensors can be provisioned (e.g., hidden from sight for aesthetic reasons) to detect potential collisions involving the spinning rotor.

Display 12 offers a screen at which video data can be rendered for the end user. Note that as used herein in this Specification, the term 'display' is meant to connote any element that is capable of delivering an image, video data, text, sound, audiovisual data, etc. to an end user during a video session. This would necessarily be inclusive of any panel, plasma element, television, monitor, electronic surface, computer interface, screen, or any other suitable element that is capable of delivering such information. Note also that the term 'video session' is meant to connote any type of media or video session (or audio-video) provided in any protocol or format that could be provided in conjunction with display 12.

In one particular example, cameras 16a-b are Internet protocol (IP) cameras configured to record, maintain, cache, receive, and/or transmit data. This could include transmitting packets over an IP network to a suitable next destination. Recorded files could be stored in the cameras themselves, or provided in some suitable storage area (e.g., a database, a server, etc.). In a particular example, there is no storage on the rotor or its cameras, where the video signals should be quickly transferred from the cameras and on to the next stage in milliseconds (or else the system latency may become unacceptable). In a particular implementation, cameras 16a-b are sensitive, high-shutter speed, HD cameras that include suitable lens configurations. In one particular instance, cameras 16a-b are separate network devices: having an assigned IP address (separately or as a unit). Each of cameras 16a-b could be a wireless camera, an HD camera, or any other suitable camera device configured to capture image information associated with a participant positioned in front of display 12.

Cameras 16a-b can be configured to capture the image data and send it to any suitable processing platform, or to a server (e.g., shown and FIG. 8) attached to the network for processing and for subsequent distribution to remote sites (e.g., to other participants in the video session). The server could include an image-processing platform such as a media experience engine (MXE), which is a processing element that can attach to the network. The MXE can simplify media sharing across the network by optimizing its delivery in any format for any device. The server could also provide media conversion, real-time postproduction, editing, formatting, and network distribution for subsequent communications. The system can utilize real-time face and eye recognition algorithms to detect the position of the participant's eyes in a video session. Any type of image synthesizer (e.g., within the server, at a remote location, somewhere in the network, etc.) can process the video data captured by cameras 16a-b.

In one example implementation, optics elements 18a-b are mirrors provided a certain distance away from cameras 16a-b, and which can be configured/mounted on a side of the shaft. Alternatively, any suitable length, mounting, or positioning can be used in order to appropriately provision optics elements 18a-b in relation to cameras 16a-b and/or display 12. This particular configuration allows the mirror to interface with cameras 16a-b and any objects in front of display 12. [Note that a simple bracket(s) can be used to help position optics elements 18a-b, which could be secured to a shaft, to cameras 16a-b, to display 12, or to any other structural element in the surrounding environment.]

Moreover, optics elements 18a-b can be designed to achieve any desired optical resultant. For example, by changing the shape, size, angles, surface coating, etc., optics elements 18a-b can realize an appropriate viewpoint for a given video conferencing system. In addition, optics elements 18a-b can be part of a set of lenses, mirrors, surfaces, etc., which can be exchanged in (and out of) the system based on particular conferencing scenarios. Optics elements 18a-b can be made of any type of material that fosters its reflective properties. In one particular instance, optics elements 18a-b are mirrors; however, optics elements 18a-b may alternatively be any optical component that can be used in video conferencing scenarios involving a video camera (such as the environment illustrated in FIG. 1). This is inclusive of transparent objects, reflective objects, refractive objects, lenses, hybrid objects (where part of the object is reflective and part of the object is transparent), or any other suitable object (inclusive of any appropriate coating or texture for facilitating the collecting, reflecting, or filtering of image data).

Note that FIG. 2 is only illustrating one, of the many possible configurations, of system 10. Other configurations are clearly within the broad scope of the present disclosure. For example, any suitable illumination elements can be added to a given rotor and/or display, where such designs can optimize the image capturing activities for particular scenarios. It should also be noted that the described mirrors could be modified such that half of the mirror offers a transparent surface and half of the mirror offers a reflective surface. Other suitable space allocations of surface area can be used in the design of the rotational assembly, the shaft, etc.

It is also imperative to note that rotating mechanisms of system 10 are not solely limited to the motor arrangement discussed above. For example, air systems could be used in conjunction with any of the previously discussed objects in order to suitably minimize vibration, assist in rotating cameras 16a-b, etc. In addition, other securing examples could include spring mechanisms that secure cameras 16a-b in place and/or allow cameras 16a-b and optics elements 18a-b to be provisioned differently. In other embodiments involving more mechanical systems, simple latching mechanisms could be used to restrain cameras 16a-b at their designated locations.

Figure 3A:
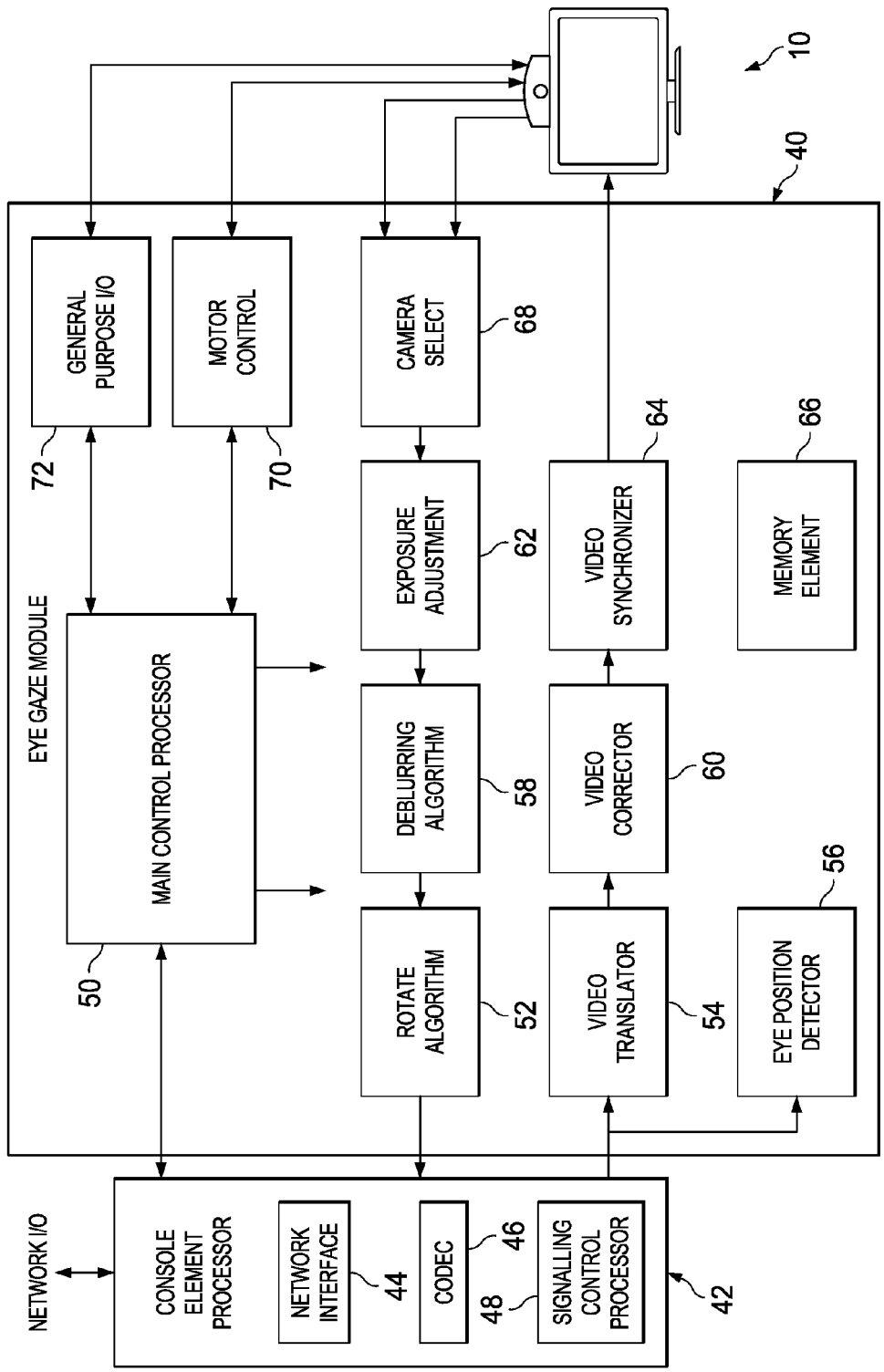
FIG. 3A is a simplified block diagram illustrating example details associated with the system.

Turning to FIG. 3A, FIG. 3A is a simplified block diagram of an eye gaze module 40 that may be used in system 10. Eye gaze module 40 may be resident in the actual display 12 (e.g., provided in the back, side, front of display 12, provided in a small proprietary device coupled to display 12, etc.) or be provisioned in a server (such as that depicted in FIG. 8) that has a connection to display 12. Logistically, the arrangement of FIG. 3A depicts the rotating camera assembly (on the right side) and a control system (with video inputs, outputs, control interfaces) on the left side. In one particular arrangement, system 10 includes two video signal processing chains (i.e., one for display 12, another for cameras 16a-b), along with a number of auxiliary functions. In the particular example, the video signal processing chains can be implemented on one or more high performance digital signaling processor (DSP) chips: either integrated in the control system, or provisioned as an external auxiliary box.

Depending on its setup, system 10 can be presented with certain challenges associated with precise camera alignment for eye positions, regions of reduced image quality (where the rotor momentarily obscures the display), flicker, inadequate exposure, motion blur image rotation, etc. For this reason, carefully designed (forward and reverse) video processing chains can be implemented to address these issues and, thereby, reduce objectionable properties.

In a particular implementation, eye gaze module 40 may include a main control processor 50, which is configured to manage system configuration, synchronization, video parameters, mode control, user interface, and any other suitable activities associated with system 10. Eye gaze module 40 may also include a rotate algorithm 52, which is configured to transform the image to compensate for shutter characteristics and exposure timing (e.g., away from the bottom dead center). Additionally, eye gaze module 40 may include a deblurring algorithm 58, which is configured to remove certain aspects of the motion blur caused by the rotors spinning.

Eye gaze module 40 may also include a video translator 54, which is configured to move the eye position on display 12 to coincide with the sweep of the cameras of system 10. Eye gaze module 40 may also include an eye position detector 56, which is configured to analyze video to determine the position of an individual's eyes, to set the camera shutter timing to snap the image at the correct location, etc. Further provided is a video corrector 60, which is configured to adjust the brightness and/or the contrast that may be present in regions shadowed by the rotor of system 10. An exposure adjustment 62 is also provided in order to compensate for poor image quality caused by the fast shutter speed. A video synchronizer 64 is also provided in order to match the output scan rate to the rotor speed (e.g., in order to reduce flicker characteristics).

A memory element 66 is also provided in eye gaze module 40, where memory element 66 can store any suitable data relevant to the operational aspects of system 10. A camera select 68 is also provided in eye gaze module 40 and, further, is configured to alternate between the two cameras on the rotor of the architecture. A motor control 70 is also provided, where this element can be associated with a servo amplifier to drive the motor, the interface to a shaft position encoder, or any other suitable element within the architecture. Additionally provided in eye gaze module 40 is a general-purpose input/output (I/O) 72, which can be configured to trigger the shutter, camera control, lighting control, rotor collision sensor, etc.

FIG. 3A also includes a network I/O interface for a console element 42, which may include a network interface 44, a codec 46, and a signaling control processor 48. Hence, console element 42 can be associated with any suitable network interface (inclusive of appropriate drivers), codec signaling, control processor activities, or any other suitable operations that can engender, or otherwise facilitate, the activities of system 10. Hence, image-processing algorithms such as translation, rotation, contrast enhancement, exposure compensation, and motion blur removal can have their operational parameters set and, further, integrated with a specific rotating camera design to provide desirable video processing results.

In operation, and beginning with the processing steps associated with the video signal destined for rendering on the local display 12, a video signal propagates from a given processor. This can be an HDMI or a DVI port, which could be connected directly to display 12. The architecture can be configured to intercept this video signal, and route it through three processing steps. The first step in the monitor chain is a translator, which is configured to accept the incoming video.

For example, video translator 54 can be configured to perform translation activities (up or down) such that the eyes on the displayed face are in perfect alignment with the camera height (i.e., as the cameras sweep in front of the display). The same effect could be achieved by mechanical translation of the camera assembly; however, an (entirely) electronic approach does have cost and reliability advantages. The degree of translation can be determined by the output of eye position detector 56. Subsequently, the translated video can flow to video corrector 60, which can include a video corrector algorithm. The algorithm can be configured to compensate for the optical artifact that the rotor introduces as it moves past the display.

It is imperative to note that the architecture of FIG. 3A does not have to be associated with any rotational camera aspects of the present disclosure. The coordination activities can be used in conjunction with existing videoconferencing equipment and/or hardware. Stated in similar terms, the operational capabilities of the configuration of FIG. 3A is applicable to any videoconferencing system.

For example, rotate algorithm 52 is valuable in situations where the cameras are not rotating. In some embodiments, the camera may be fixed (e.g., to the cover of a laptop or other mobile device). Inertial sensors or horizon sensors/horizon sensing algorithms could determine the tilt of the camera, where rotate algorithm 52 could modify the image such that objects within it have the correct orientation.

Separately, video translator 54 is similarly beneficial in situations where the camera does not rotate. Video translator 54 can receive the output of video cameras that are not necessarily operated by a camera person and, further, make the resulting video appear more professional. Eye position detector 56 can determine the position of eyes (or other important features of a human face), and translate the image to move those features to preferred locations on the output image. The rules of cinematography prefer certain spacing between the top of a person's head and the top of the screen to provide the most aesthetically pleasing image (sometimes referred to as "headroom" by camera operators). The video translate block can automatically optimize the headroom in the output image even when the camera is not pointed correctly.

Figure 3B:
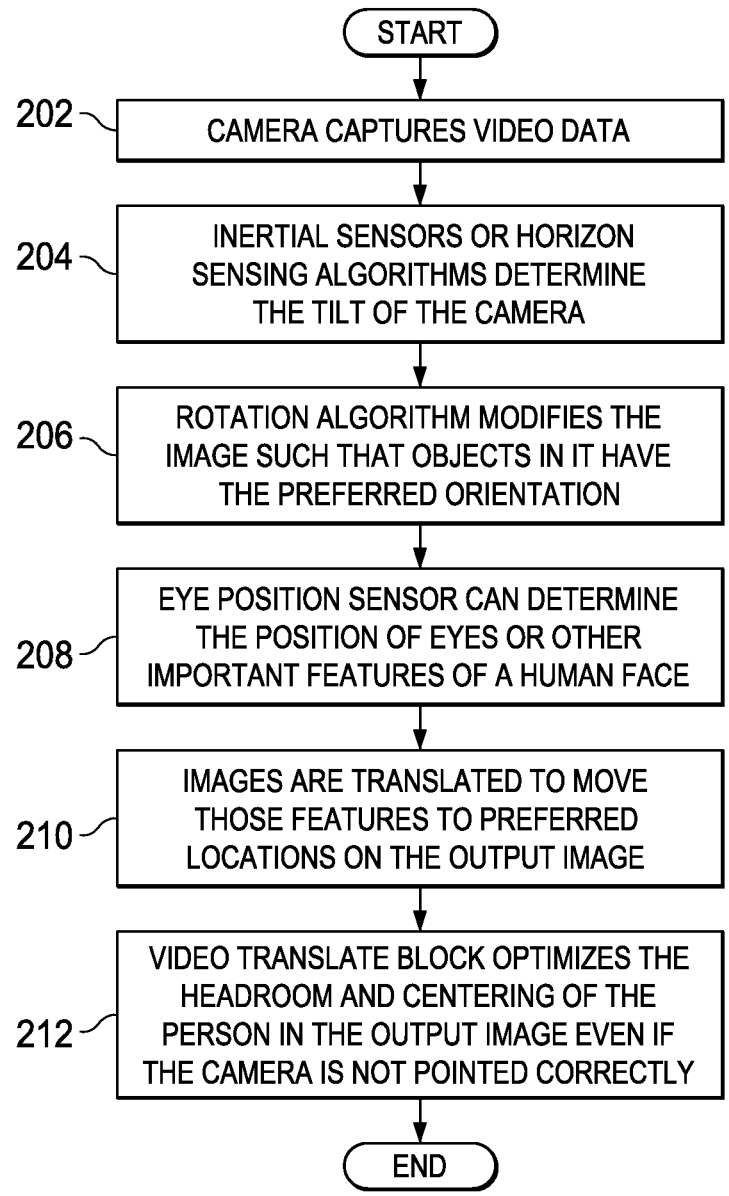
FIG. 3B is a simplified flowchart illustrating activities associated with an example operation of the system.

FIG. 3B is a simplified flowchart illustrating one example implementation associated with the present disclosure. It should be noted that the operations described with reference to FIG. 3B are not specific to rotating cameras. Any videoconferencing system can benefit from the operational capabilities detailed in FIG. 3B. The flow may begin at 202, where a given camera captures video data. At 204, inertial sensors or horizon sensing algorithms determine the tilt of the camera. At 206, the rotate algorithm is configured to modify the image such that objects in it have a preferred orientation.

At 208, the eye position detector can determine the position of eyes (or other important features of a human face). At 210, images are translated in order to move those features to preferred locations on the output image. At 212, the video translator optimizes the headroom and centering of the person in the output image: even if the camera is not pointed correctly.

Figure 3C:
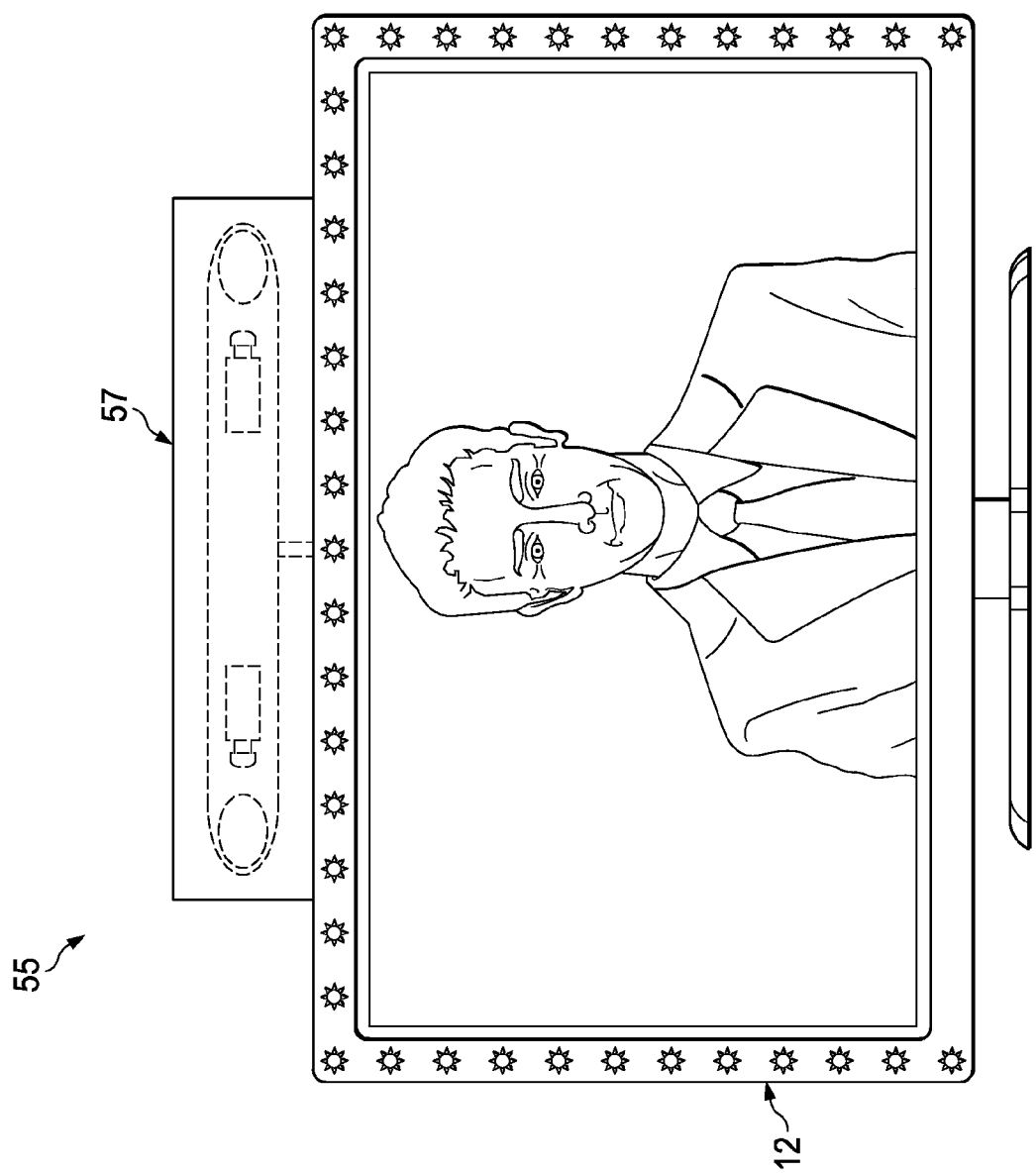
FIG. 3C is a simplified schematic diagram illustrating an example implementation associated with a video conferencing environment.

FIG. 3C illustrates an example embodiment 55 associated with a set-top camera system 57 in which the cameras of the present disclosure are fully enclosed. In addition, camera system 57 may include equipment similar to the equipment of FIGS. 1-2; however, the actual cameras would rotate in a horizontal plane. In that implementation, rotational activities of the cameras would not encounter obstructions in their pathway. Moreover, in such a scenario, a single panoramic view could be captured as each camera spins in front of the viewable area of set-top camera system 57. The features and capabilities of the architecture of set-top camera system 57 can be similar to those described in FIG. 3A.

In other scenarios, the rotor has a stationary mode in which the cameras do not rotate. For example, when the user of the system is not engaged in a videoconferencing session (where the eye gaze alignment of the camera's output image is important), the system can stop the movement of rotor 20 in a horizontal position, which can be parallel to the top of display 12. In this mode, cameras 16a and 16a can remain active: providing a stereoscopic view of the user's workspace. Camera select 68 can alternately select the images from each camera, where rotate algorithm 52 would turn the images +/−90 degrees to insure they have the correct alignment. This can provide general imaging for people detection (to turn off the lights in unoccupied rooms, for example). Further, it can be used in security camera applications, surveillance, or in any other architecture in which general imaging would be beneficial.

Additionally, since the cameras have two different views of the scene, and in an example embodiment, their inter-camera spacing is wider than normal eye spacing, hyperstereo photography techniques can be employed to determine the depth of objects in the scene. One important use for this accurate depth sensing capability would be gesture recognition to supplement a mouse control feature for the system, or for use in video games. This could add an important front/back dimension to the up/down and left/right gesture tracking in certain gesture systems.

Figure 4:
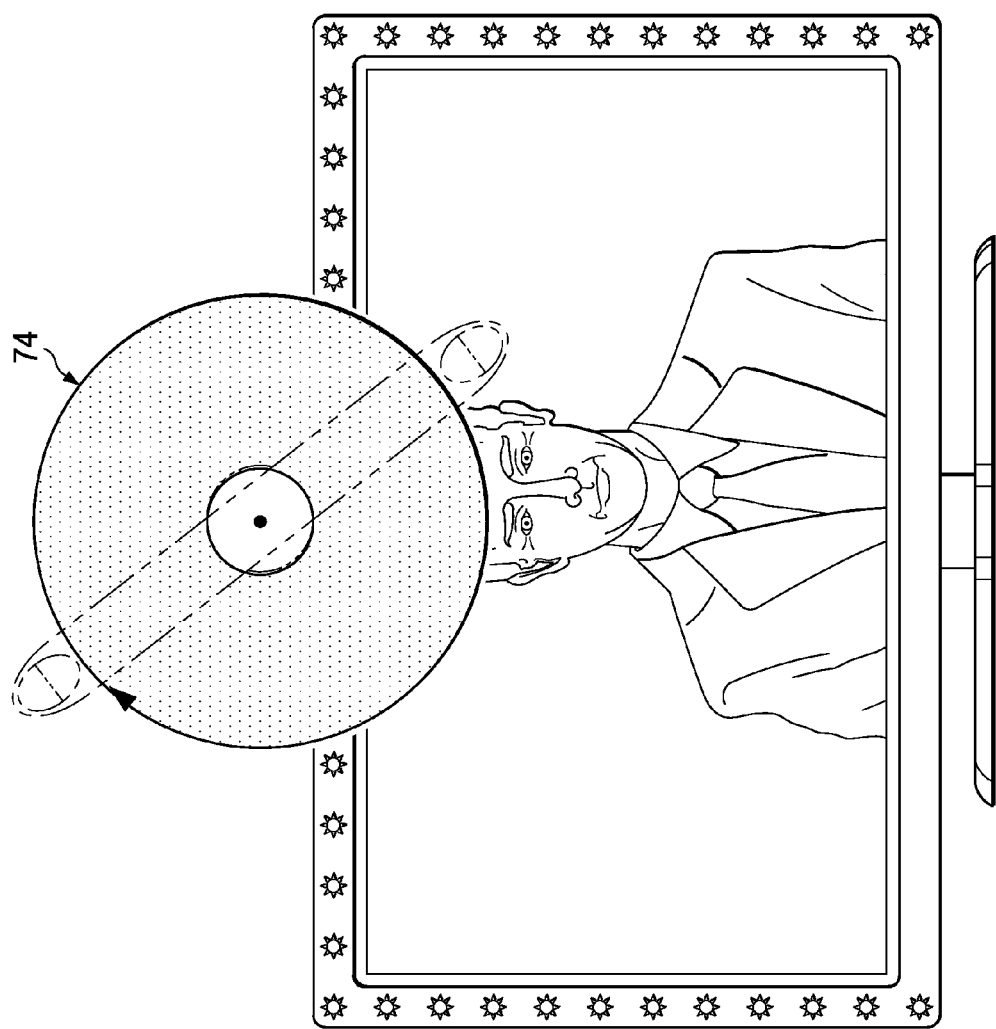
FIG. 4 is a simplified schematic diagram illustrating an example implementation associated with a video conferencing environment.

Turning to FIG. 4, FIG. 4 is a simplified schematic diagram illustrating certain functional aspects associated with an example implementation of system 10. Note that a semicircular region of the display area is partially obscured by rotor 20 (which itself moves too fast to be seen) and, thus, may appear darker and/or may have less contrast. Ambient light may also reflect off rotor 20: adding another source of optical artifacts. In addition, the region of display 12 that is obscured by the camera's lens openings may create a somewhat different optical artifact.

Figure 5A:
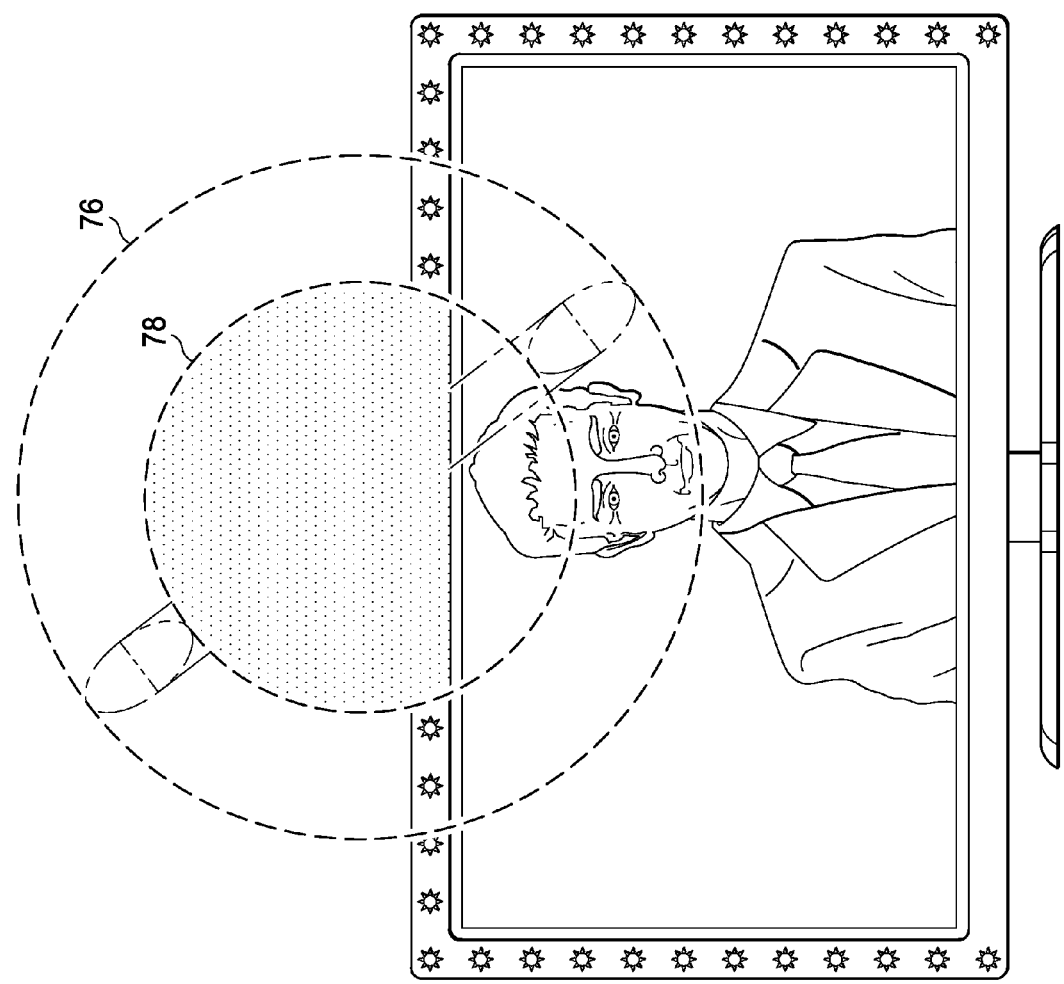
FIG. 5A is a simplified schematic diagram illustrating an example implementation associated with a video conferencing environment.

Hence, in the particular example of FIG. 4, a rotor is rotating such that a video artifact (in a region 74) is left by the black rotor intermittently covering display 12. Similarly, just beyond this radius, a video artifact can be left by the ambient light reflection from optics elements 18a-b. In operation, video corrector 60 can be configured to adjust the brightness and the contrast of the video in these two regions to compensate for these artifacts. Turning to FIG. 5A, FIG. 5A illustrates a region 76 and a region 78 that can be targeted for suitable image processing to remove certain deficiencies in the video. In one particular example, suitable video processing is conducted in order to remove the shadow of rotor 20.

In operation, a calibration step can be implemented to set the boundaries of the areas of the screen to be corrected. Hence, this can include setting the video adjustment parameters, compensating for parallax caused by the camera being a few centimeters in front of display 12, etc. The display signal processing chain can continue using a synchronization algorithm. Note that certain display technologies utilize raster scans, which could create various beat frequencies between the display scan rates and the rotor speed. This synchronizer can identify the scanning scheme of display 12 and, if necessary, ensure that active video scanning does not happen in regions under rotor 20, while rotor 20 is spinning.

Figure 5B:
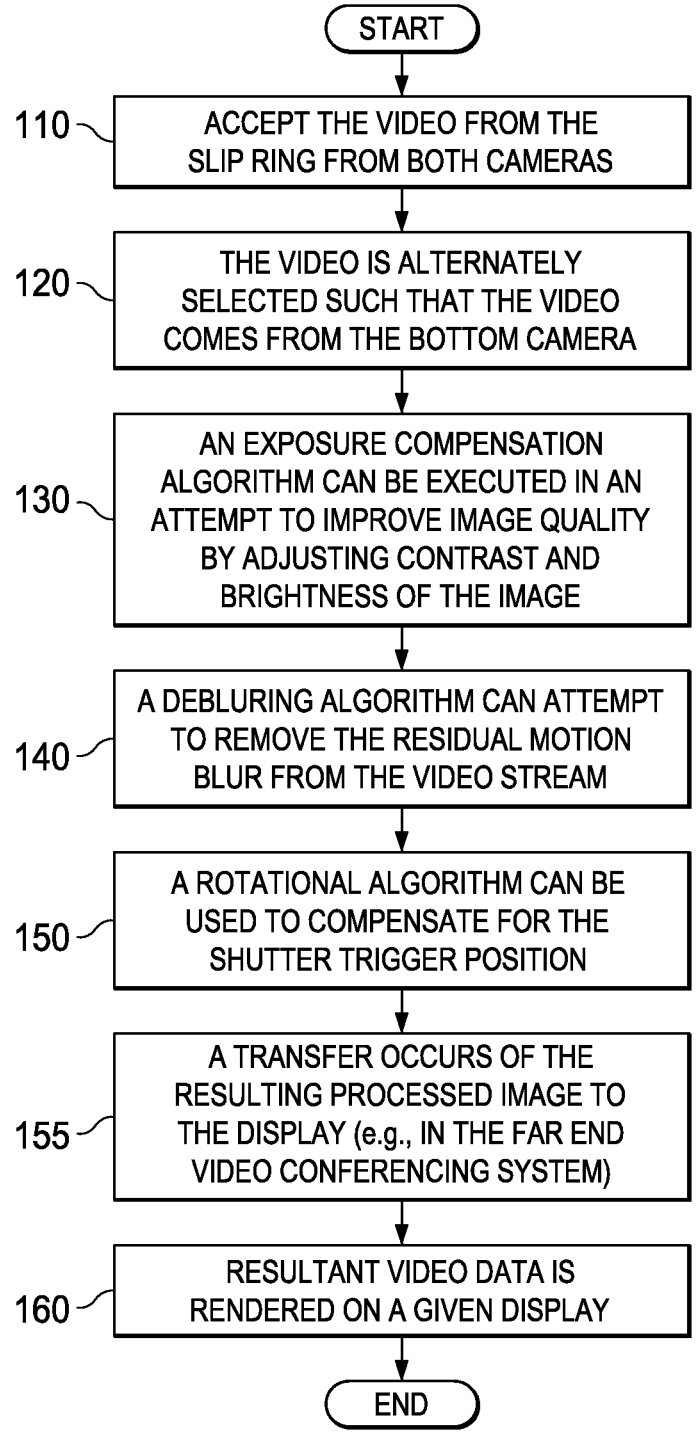
FIG. 5B is a simplified flowchart illustrating activities associated with an example operation of the system.

Turning to FIG. 5B, FIG. 5B can be associated with an operational flow for the video processing chain associated with cameras 16*a-b*. The output of this chain can connect to the video input jack on a given processor to which the fixed camera(s) would be connected. Thus, a first operation in this procedure would be to accept the video from the slip ring from both cameras, which is illustrated at 110. At 120, the video is alternately selected such that the video comes from the bottom camera. Camera select 68 can be configured to perform this activity.

At 130, exposure adjustment 62 can be used in order to execute an exposure compensation algorithm, which can be configured to improve image quality by adjusting contrast and brightness of the image. This may be important because the architecture uses extremely short exposure times to limit the motion blur from the fast moving cameras. At 140, deblurring algorithm 58 can attempt to remove the residual motion blur from the video stream. Rotor 20 can be configured to move approximately one half degree in a sub-100 microsecond exposure time, where this activity removes the motion blur being induced. Fortunately, the motion is relatively constant and predictable such that deblurring algorithms can work well in this instance.

At 150, rotate algorithm 52 can be used to compensate for the shutter trigger position, which is not necessarily (exactly) at the bottom center of the rotor's path. Depending on the horizontal position of the eye on display 12 (as determined by eye position detector 56), the trigger may occur slightly before (or after) the center position. This can result in a rotated image (perhaps +/−30 degrees). This activity can provide a high-quality image rotation to compensate (and ensure) the resulting output video has proper angular alignment. At 155, a transfer occurs of the resulting processed image to the display (e.g., in the far end video conferencing system). At 160, resultant video data is rendered on a given display.

Note that the other internal elements (e.g., those depicted in FIG. 3A) are not directly involved in video signal processing in this particular example. For example, main control processor 50 can be configured to manage the interactions of the video blocks, establish control parameters, manage user interfaces, etc. Motor control 70 can be associated with a servo motor control system, which is responsible for maintaining the correct rotor speed, ensuring the rotor reaches the desired shutter trigger position at the correct time, etc. It may have an active position and velocity feedback loop: using the outputs from the shaft position encoder. The motor control can also include a safety break that stops the rotor if the proximity sensor detects potential interference (e.g., an obstruction).

Figure 6:
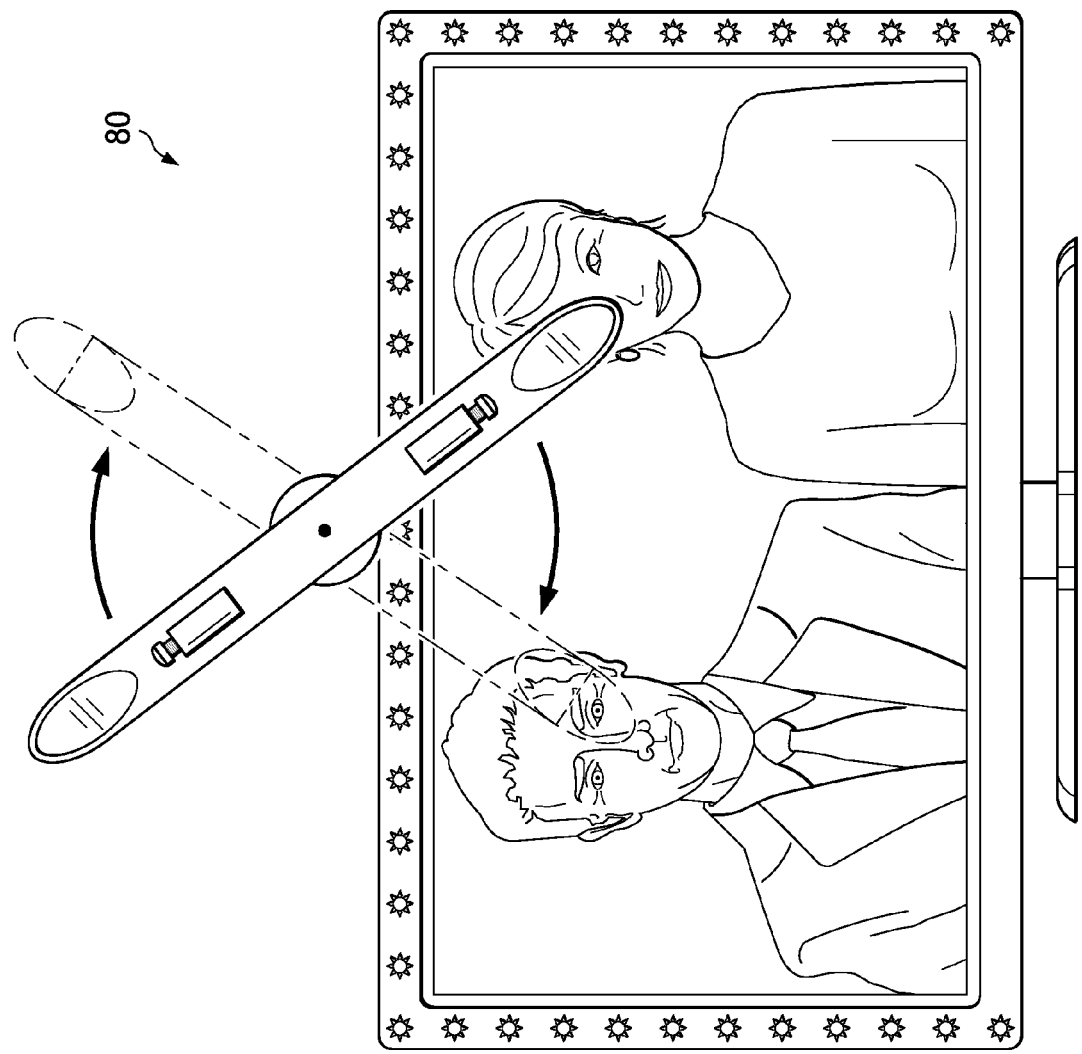
FIGS. 6-8 are simplified schematic diagrams illustrating possible implementations associated with the system.

Turning to FIG. 6, FIG. 6 a simplified schematic diagram illustrating one possible implementation 80 associated with the present disclosure. As noted previously, video conferencing systems fail to provide correct eye gaze alignment due to the imperfect locations of the cameras in a typical installation. In situations where two or more people's faces appear on the same display (as being shown in FIG. 6), the eye gaze alignment is more egregious. The camera mounted centrally above the active display screen is not only too high (e.g., by 10 or more cm), but it is also laterally misaligned (e.g., by 30-50 cm) from its correct position, which would be coincident with the eyes of the displayed faces.

Further, it should be noted that many next generation video conferencing systems use 3D imaging. Hence, to provide perfect eye gaze, two virtual camera positions should be accommodated: one coincident with the displayed face's left eye, and another camera position coincident with the displayed face's right eye. These issues can be resolved by the rotating camera system of the present disclosure.

In operation, video conferencing systems are configured to display two users from a single far end location on one display and, subsequently, photograph these individuals with a single camera. In order to correctly align the eye gaze, a camera would be provisioned in front of each user's face position. The rotating camera system of the present disclosure can be configured to serve this need. In a particular implementation, a slightly longer rotor is extended to reach to the region of the eyes of both users. The translation element (e.g., of FIG. 3A) can be configured to provide left-to-right translation in order to better align both user's eye positions with the sweep of the rotor tip. In addition, eye position detection element (e.g., of FIG. 3A) can be configured to provide screen coordinates for both user positions.

Operationally, a switching algorithm (implemented in the main control processor) can be configured to choose which of the two camera positions would be selected for transmission to the far side. In a particular operation, the selection algorithm would choose the camera position associated with the last person to speak on this screen. For example, if the woman speaks, the right side camera position in front of her would be selected until the man speaks.

Figure 7:
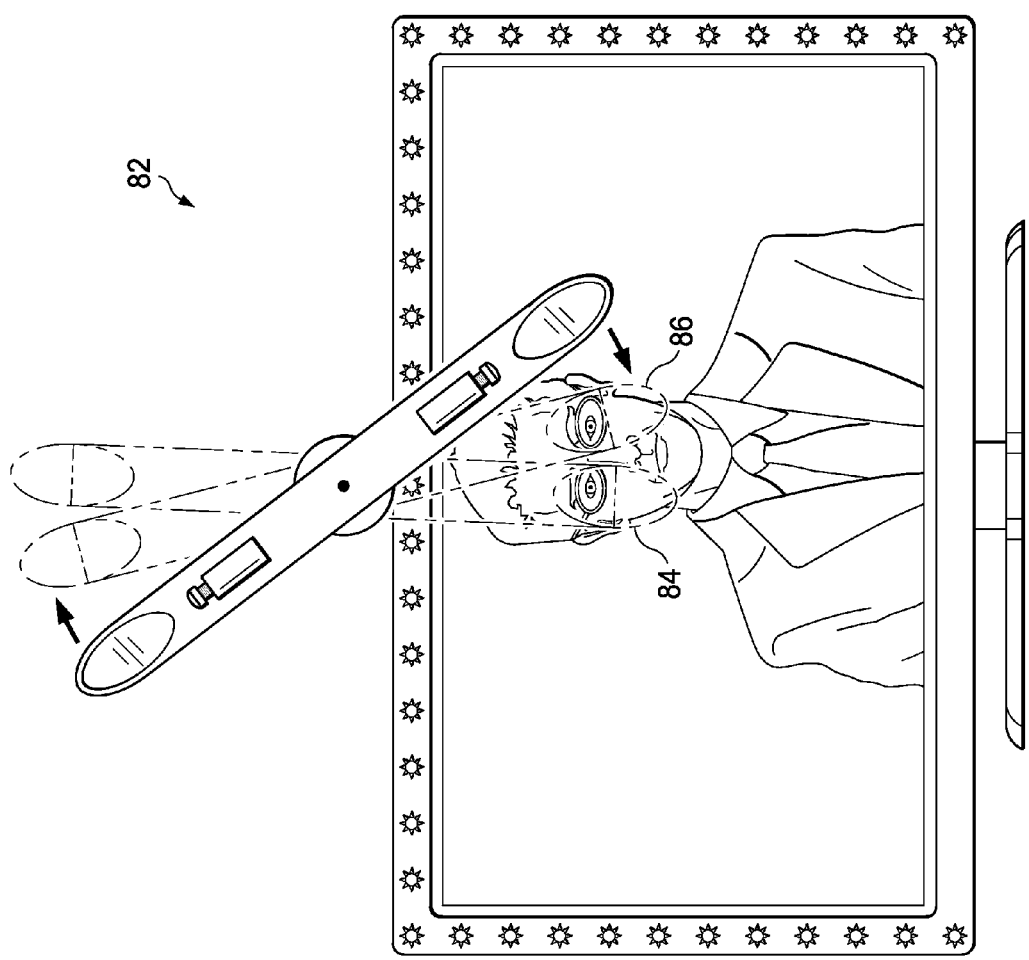

FIG. 7 is a simplified schematic diagram illustrating another possible implementation 82 of the present disclosure. In a generic sense, the architecture of FIG. 7 is depicting a potential mode of operation, which can be configured to support stereo imaging for 3D video conferencing systems. To provide better eye gaze alignment in 3D systems, two virtual camera positions can be aligned with the two far end user's eyes on the display. An eye position detector can be configured to determine the position of both the eyes on the displayed face and, further, to calculate the correct times to trigger the shutter of the HD camera to snap both left eye and right eye images (shown as elements 84 and 86) in rapid succession. These images can be transported to the far end video conferencing counterparty system and displayed on a 3D capable monitor.

The inter-camera spacing (or baseline) of the stereo image pair can be electronically variable by controlling the timing of the shutter trigger. Under typical circumstances, the positions and spacing of the left and right shutter triggers can coincide with the position and spacing of the eyes on the displayed face (e.g., about 65 mm apart in a particular implementation). However, to achieve special effects, or to compensate for different 3D viewing conditions, wider or narrower inter-camera spacing can be programmed into the control system.

Note that there can be data bandwidth challenges associated with this mode of operation. For example, approximately 10-15 degrees separate the two shutter trigger positions shown in FIG. 7. Hence, at 900 RPM, this only offers about 1 ms to read out the left eye image before the same camera should snap the right eye image. Special fast readout HD cameras may be able to accomplish this; alternatively, two cameras can be equipped on each end of the rotor (side-by-side, four per-system) such that the readout speed is not as sensitive.

Hence, the rotating camera system of the present disclosure can be configured to operate in two additional operating modes for improving eye gaze. A first mode can be configured to use a rotating camera to snap an image (optimally) located in front of one or the other of the two faces on a two-person video conferencing display. The second mode can be configured to rapidly snap two images as the camera position moves in front of the displayed user's left eye, and then right eye: creating an eye gaze correct stereo pair of video streams.

These modes can provide correct eye gaze for systems that display more than one user face on a single screen. Additionally, such modes can retain the eye gaze alignment on the most recent speaker for displays where more than one user appears on each display. Such activities can also offer correct eye gaze and camera spacing for natural appearing images in full 3D video conferencing systems. Moreover, such an architecture can allow for the control of the inter-camera baseline spacing of the stereo image pair.

Figure 8:
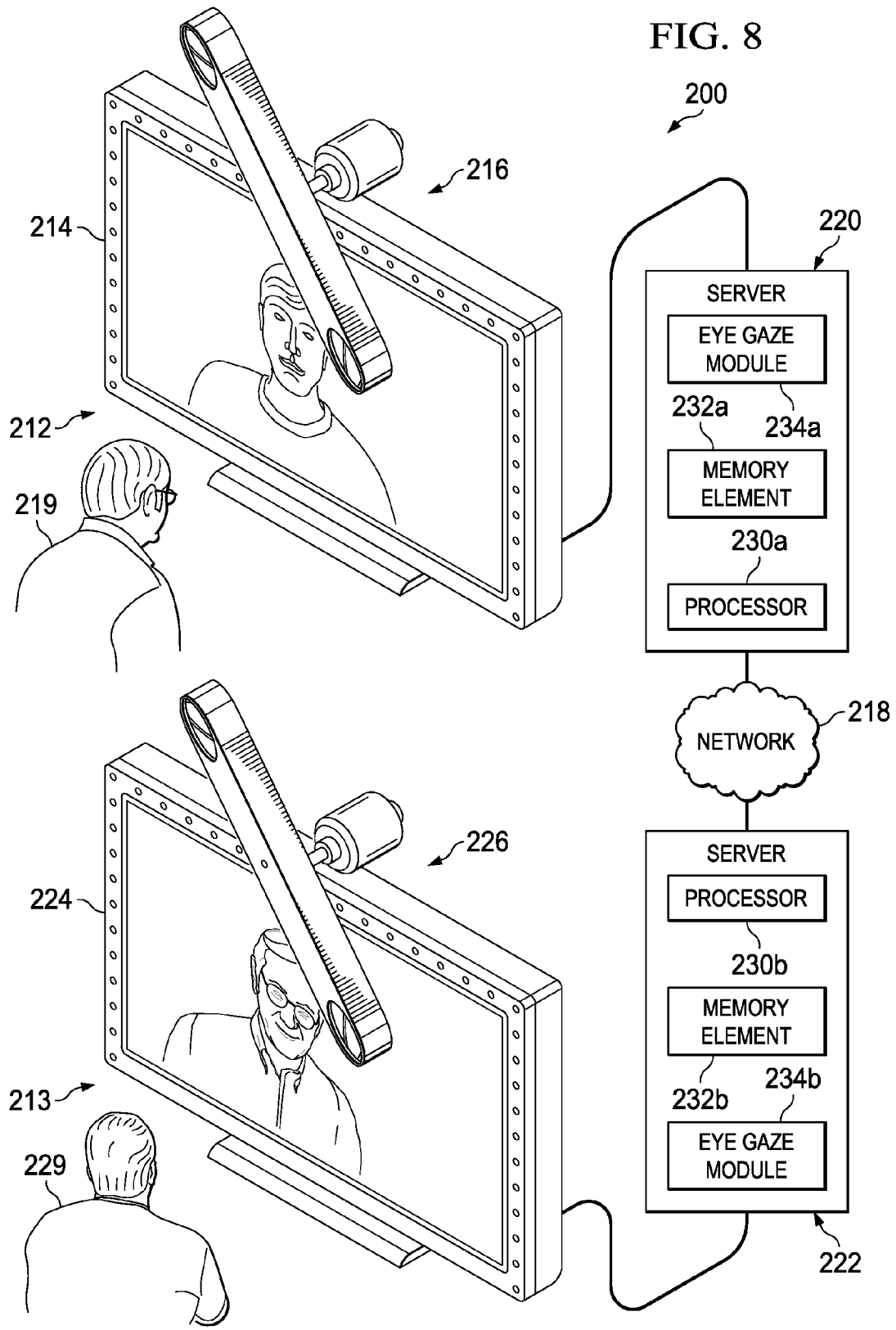

Turning to FIG. 8, FIG. 8 is a simplified schematic diagram illustrating a system 200 for video conferencing activities in accordance with one embodiment of the present disclosure. In this particular implementation, system 200 is representative of an architecture for facilitating a video conference over a network utilizing camera rotation protocols (or any suitable variation thereof), as discussed herein. System 200 includes two distinct communication systems that are represented as endpoints 212 and 213, which are provisioned in different geographic locations in this example. Endpoint 212 may include a display 214, a plurality of speakers, and a camera system 216.

Endpoint 213 may similarly include a display 224, a plurality of speakers, and a camera system 226. Additionally, endpoints 212 and 213 may be coupled to a respective server 220, 222, where the endpoints are connected to each other via a network 218. Each server may include a respective processor 230a-b, a respective memory element 232a-b, and a respective eye gaze module 234a-b, which may be configured to control rotational activities and/or manage video processing for system 200.

In the context of a conference involving a participant 219 (present at endpoint 212) and a participant 229 (present at endpoint 213), packet information may propagate over network 218 during the conference. As each participant 219, 229 communicates, camera systems 216, 226 suitably capture video images as data. Each endpoint is configured to evaluate this video data and then determine which data to send to the other location for rendering on displays 214, 224.

In one example implementation, servers 220, 222 include software (e.g., as part of eye gaze modules 234a-b respectively) to achieve the intelligent camera rotation operations and video processing, as outlined herein in this document. In other embodiments, these features may be provided externally to any of the aforementioned elements, or included in some other video element or endpoint (either of which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these skip coding management operations, as disclosed herein.

Server 220 is configured to receive information from camera system 216 via some connection (wired or wireless), which may attach to an integrated device (e.g., a set-top box, a proprietary box, etc.), which can sit atop a display. Server 220 may also be configured to control compression activities, or additional processing associated with data received from the cameras. Alternatively, a physically separate device can perform this additional processing before image data is sent to its next intended destination. Server 220 can also be configured to store, aggregate, process, export, and/or otherwise maintain image data and logs in any appropriate format, where these activities can involve processors and memory elements.

In certain example implementations, servers 220, 222 are part of set-top box configurations. In example instances, servers 220, 222 are network elements that facilitate a data flow with their respective counterparty. As used herein in this Specification, the term 'network element' is meant to encompass routers, switches, gateways, bridges, loadbalancers, firewalls, servers, processors, set-top boxes, network appliances, modules, or any other suitable device, component, element, or object operable to exchange information in a network environment. This includes proprietary elements equally, which can be provisioned with particular features to satisfy a unique video conferencing scenario or a distinct environment.

Server 220 may interface with camera system 216 through a wireless connection, or via one or more cables or wires that allow for the propagation of signals between these two elements. These devices can also receive signals from an intermediary device, a remote control, etc., where the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between server 220 and camera system 216. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs. For example, a single box may encompass audio and video reception capabilities (e.g., a set-top box that includes server 220, along with camera and microphone components for capturing video and audio data).

In one example implementation, a given endpoint (e.g., provisioned directly in display 12, at display 12, or proximate thereto) and/or server 220 can include software in order to achieve the intelligent camera rotation (and associated video processing) outlined herein. This can be provided through instances of eye gaze modules 40, 234a-b, etc., or through any other appropriate equipment. Additionally, each of these endpoints and/or servers may include a processor that can execute software or an algorithm to perform camera rotation activities and suitable video processing, as discussed in this Specification.

Note that the architecture of FIG. 8 may also include a suitable touchpad and/or a remote control for managing the rotating camera system and accompanying video processing. The touchpad may include audio features, sharing features (e.g., for sharing data, documents, applications, etc. between video conferencing participants), application features (e.g., where the applications are being executed in conjunction with a video conference), calling/connection features (e.g., transferring calls, bridging calls, initiating calls, connecting parties, receiving calls, etc.) or any other end-user features that can be applicable to a video conference. In one particular arrangement, the touchpad and the remote control are wireless; however, the touchpad and the remote control could alternatively be implemented with suitable wires, cables, infrared, etc. in order to facilitate the operations thereof.

Note that in certain example implementations, the camera rotation and video processing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 3, 8] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIGS. 3, 8] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Each of servers 220, 222 and/or display 12 may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each of servers 220, 222 and/or display 12 can include suitable interfaces for receiving, transmitting, and/or otherwise communicating data or information in a network environment.

Note that with the example provided above, as well as numerous other examples provided herein, interaction may be described in terms of two or three components. However, this has been done for purposes of clarity and example only. In certain cases, it may be easier to describe one or more of the functionalities of a given set of flows by only referencing a limited number of components. It should be appreciated that system 10 (and its teachings) are readily scalable and can accommodate a large number of components, participants, rooms, endpoints, sites, etc., as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible conferencing scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

For example, although cameras 16a-b and optics elements 18a-b have been described as being mounted in a particular fashion, cameras 16a-b and optics elements 18a-b could be mounted in any suitable manner in order to capture image data from an effective viewpoint. Other configurations could include suitable wall mountings, aisle mountings, furniture mountings, cabinet mountings, etc., or arrangements in which cameras and/or optics element would be appropriately spaced or positioned to perform its functions. It should also be noted that the present disclosure can accommodate multiple mirrors being used to reflect image data before ultimately being captured by a given camera. This multi-mirror design could further enhance the effective viewpoint for a given system. Additionally, system 10 can have direct applicability in Tele-Presence environments (both large and small) such that quality image data can be collected during video sessions. This includes desktop video conferencing devices, consumer-based video conferencing platforms, etc. Moreover, although system 10 has been illustrated with reference to particular elements and operations that facilitate the communication process, these elements and operations may be replaced by any suitable architecture or process that achieves the intended functionality of system 10.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   first and second cameras configured to capture image data in a video session;
   a display configured to interface with the cameras and to display an image extending in a first direction and a second direction perpendicular to the first direction; and
   a shaft coupled to a rotor mounted on a member protruding above the display in a third direction perpendicular to the first direction and the second direction, wherein the cameras are secured to the shaft, and the shaft receives a rotational force such that, during a rotation of the shaft, the cameras rotate about the member in a plane extending in the first direction and the second direction to capture particular image data.

2. The apparatus of claim 1, wherein a video frame is captured as a particular one of the cameras rotates into a position coincident with an eye of a displayed face on the display.

3. The apparatus of claim 1, further comprising:
   optics elements configured to affect an image path associated with the cameras, wherein the optics elements comprise a mirror.

4. The apparatus of claim 1, wherein the shaft is configured to rotate at a rate such that one of the cameras rotates to a shutter trigger position at a frequency equal to a frame rate of an associated video system to which the cameras are associated.

5. The apparatus of claim 1, further comprising:
illumination elements disposed on a perimeter of the display, wherein at least some of the illumination elements are synchronized to shutter times associated with at least one of the cameras.

6. The apparatus of claim 1, wherein the rotational force is supplied by a motor assembly.

7. The apparatus of claim 6, wherein the motor assembly includes a shaft position encoder configured to determine an angular position of the shaft during the rotation of the shaft.

8. The apparatus of claim 1, further comprising:
a slip ring assembly configured to bring power and control signals to the cameras and to transfer video signals from the cameras to a next destination.

9. The apparatus of claim 1, wherein a surface finish of the rotor comprises an anti-reflective black surface.

10. A method, comprising:
capturing image data using first and second cameras;
rendering at least a portion of the image data at a display during a video session, wherein the display displays an image extending in a first direction and a second direction perpendicular to the first direction; and
providing a rotational force to a shaft coupled to a rotor mounted on a member protruding above the display in a third direction perpendicular to the first direction and the second direction, wherein the cameras are secured to the shaft such that, during a rotation of the shaft, the cameras rotate about the member in a plane extending in the first direction and the second direction to capture particular image data.

11. The method of claim 10, wherein a video frame is captured as a particular one of the cameras rotates into a position coincident with an eye of a displayed face on the display.

12. The method of claim 10, wherein the shaft is configured to rotate at a rate such that one of the cameras rotates to a shutter trigger position at a frequency equal to a frame rate of an associated video system to which the cameras are associated.

13. The method of claim 10, further comprising:
synchronizing illumination elements, which are disposed on a perimeter of the display, to shutter times associated with at least one of the cameras.

14. The method of claim 10, wherein the rotational force is supplied by a motor assembly, which includes a shaft position encoder configured to determine an angular position of the shaft during the rotation of the shaft.

15. The method of claim 10, further comprising:
providing power and control signals to the cameras using a slip ring assembly, the slip ring assembly being further configured to transfer video signals from the cameras to a next destination.

16. Logic encoded in one or more non-transitory tangible media that includes code for execution and, when executed by a processor, operable to perform operations comprising:
capturing image data using first and second cameras;
rendering at least a portion of the image data at a display during a video session, wherein the display displays an image extending in a first direction and a second direction perpendicular to the first direction; and
providing a rotational force to a shaft coupled to a rotor mounted on a member protruding above the display in a third direction perpendicular to the first direction and the second direction, wherein the cameras are secured to the shaft such that, during a rotation of the shaft, the cameras rotate about the member in a plane extending in the first direction and the second direction to capture particular image data.

17. The logic of claim 16, wherein a video frame is captured as a particular one of the cameras rotates into a position coincident with an eye of a displayed face on the display.

18. The logic of claim 16, wherein the shaft is configured to rotate at a rate such that one of the cameras rotates to a shutter trigger position at a frequency equal to a frame rate of an associated video system to which the cameras are associated.

19. The logic of claim 16, the operations further comprising:
synchronizing illumination elements, which are disposed on a perimeter of the display, to shutter times associated with at least one of the cameras.

20. The logic of claim 16, wherein the rotational force is supplied by a motor assembly, which includes a shaft position encoder configured to determine an angular position of the shaft during the rotation of the shaft.

* * * * *